US011226928B2

(12) United States Patent
Guo et al.

(10) Patent No.: US 11,226,928 B2
(45) Date of Patent: Jan. 18, 2022

(54) PACKET TRANSMISSION METHOD AND APPARATUS

(71) Applicant: Huawei Technologies Co., Ltd., Shenzhen (CN)

(72) Inventors: Zhongtian Guo, Hangzhou (CN); Tao Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/928,396

(22) Filed: Jul. 14, 2020

(65) Prior Publication Data

US 2021/0019282 A1 Jan. 21, 2021

(30) Foreign Application Priority Data

Jul. 15, 2019 (CN) .......................... 201910637678.3
Sep. 25, 2019 (CN) .......................... 201910914078.7

(51) Int. Cl.
G06F 15/82 (2006.01)
H04L 12/741 (2013.01)

(52) U.S. Cl.
CPC ............. G06F 15/82 (2013.01); H04L 45/74 (2013.01)

(58) Field of Classification Search
None
See application file for complete search history.

(56) References Cited

U.S. PATENT DOCUMENTS

2003/0229685 A1   12/2003   Twidale et al.
2007/0083622 A1   4/2007    Wang et al.
2007/0101242 A1*  5/2007    Yancey ............... G06F 13/4256
                                                        714/776
2012/0128004 A1*  5/2012    Aybay .................. H04L 41/082
                                                        370/401
2013/0346985 A1*  12/2013   Nightingale ........ G06F 15/7871
                                                        718/102
2014/0244204 A1*  8/2014    Frediani ........... G01R 31/31907
                                                        702/119
2015/0052284 A1   2/2015    Maitra
(Continued)

FOREIGN PATENT DOCUMENTS

CN        1527544 A      9/2004
JP     2006268862 A     10/2006
(Continued)

Primary Examiner — Eric Coleman
(74) Attorney, Agent, or Firm — Conley Rose, P.C.

(57) ABSTRACT

A packet transmission apparatus includes a processor such as a CPU, a first processing chip, and a second processing chip. The second processing chip is separately connected to the processor and the first processing chip. For example, it may be considered that the second processing chip is disposed between the processor and the first processing chip. The first processing chip is a non-programmable chip such as an ASIC chip, and the second processing chip is a programmable chip such as an FPGA chip. The second processing chip supports a second functional, and the second functional is updatable. Both the processor and the first processing chip are configured to exchange a packet with the second processing chip. The second processing chip is configured to process a received packet based on the second functional, and send the processed packet to the processor or the first processing chip.

20 Claims, 18 Drawing Sheets

(56) References Cited

U.S. PATENT DOCUMENTS

2018/0048562 A1* 2/2018 Meyer .................. H04L 43/028
2018/0150654 A1* 5/2018 Connor .................. G09C 1/00
2018/0191631 A1* 7/2018 Biederman ......... H04L 67/2842

FOREIGN PATENT DOCUMENTS

WO        2018176238 A1    10/2018
WO    WO-2019090099 A1 *  5/2019  ............. H04L 69/22

* cited by examiner

PACKET TRANSMISSION METHOD AND APPARATUS

CROSS-REFERENCE TO RELATED APPLICATIONS

This claims priority to Chinese Patent App. No. 201910637678.3 filed on Jul. 15, 2019 and Chinese Patent App. No. 201910914078.7 filed on Sep. 25, 2019, which are incorporated by reference.

TECHNICAL FIELD

This disclosure relates to the field of computer technologies, and in particular, to a packet transmission method and an apparatus.

BACKGROUND

In fields such as the internet and public cloud, an iteration speed of hardware configuration of a server is increasingly slower than an update speed of service deployment of the server. Therefore, more vendors start to consider customized hardware. In the field of the customized hardware, many vendors in the industry adopt customized application-specific integrated circuit (ASIC) chips or field-programmable gate array (FPGA) chips to implement function deployment based on service requirements of the vendors.

The ASIC chip is developed for a specific scenario, and therefore has a unique advantage in aspects, such as performance, power consumption, and scenario adaptation. However, once a service scenario changes, the ASIC chip may be unable to adapt to a new service scenario. To adapt to the new service scenario, the ASIC chip needs to be iteratively developed. Consequently, service discontinuity is caused. In addition, a development cycle for the ASIC chip is comparatively long, and costs are comparatively high. For example, to implement a feature, such as a feature based on an RDMA over Converged Ethernet (RoCE), currently a complete implementation solution is solidified by using the ASIC chip. However, as technologies develop and iterate, a new solution is derived from the existing solution. The new solution can implement a lower network latency, and support better network congestion processing. To support the new solution, the ASIC chip needs to be upgraded. However, a cycle for upgrading the chip takes a long time (for example, two to three years), which far exceeds a vendor's requirement for service deployment.

The FPGA chip is a programmable chip, and its development cycle is comparatively short and costs are comparatively low. However, currently a dominant frequency of an FPGA chip is usually only several hundred megahertz, which is one order of magnitude lower than a dominant frequency of the ASIC chip. Limited by the dominant frequency of the FPGA chip, performance of the FPGA chip is poor compared with that of the ASIC chip having a same function. To implement that the FPGA chip has a same function and same performance with the ASIC chip, specifications of the FPGA chip are comparatively high. Engineering implementation is difficult (for example, a large package size and high heat consumption).

SUMMARY

Embodiments provide a packet transmission method and an apparatus, to help decrease a development cycle (or costs) and improve operating performance of a chip externally connected to a CPU in a server, and improve overall performance of the server.

According to a first aspect, a server is provided. The server includes a processor, a first processing chip, and a second processing chip, the second processing chip is separately connected to the processor and the first processing chip, the first processing chip is a non-programmable chip, the second processing chip is a programmable chip, and the second processing chip supports a second functional feature. The processor is configured to exchange a packet with the second processing chip; the first processing chip is configured to exchange a packet with the second processing chip; and the second processing chip is configured to: process a received packet based on the second functional feature, and send the processed packet to the processor or the first processing chip. In this technical solution, it may be considered that the programmable chip such as an FPGA chip is added between the processor such as a CPU and the non-programmable chip such as an ASIC chip, so that the non-programmable chip can perform some functional features presented by the processor to a client, and the programmable chip can perform the other functional features presented by the processor to the client. Compared with another solution in which only the ASIC chip or only the FPGA chip performs the functional feature presented by the CPU to the client, this solution helps decrease a development cycle (or costs) and improve operating performance of a chip externally connected to the CPU, and improve overall performance of the server.

In a possible design, the processor is further configured to send a first packet to the second processing chip; and the second processing chip is further configured to: process the first packet based on the second functional feature to obtain a second packet, and send the second packet to the processor or the first processing chip. This possible design provides a transmission path for the packet sent by the processor.

In a possible design, the second processing chip is further configured to: if the second packet carries identification information of the first processing chip (for example, an Internet Protocol (IP) address of the first processing chip) or information about a functional feature supported by the first processing chip, send the second packet to the first processing chip. This possible design provides an implementation solution in which the second processing chip selects a path for the packet processed by the second processing chip.

In a possible design, the second processing chip is further configured to: if the second packet carries information about the processor (for example, a memory address that the processor needs to gain access to), send the second packet to the processor. This possible design provides another implementation solution in which the second processing chip selects a path for the packet processed by the second processing chip.

In a possible design, the first processing chip is further configured to: process a received third packet to obtain a fourth packet, and send the fourth packet to the second processing chip; and the second processing chip is further configured to: send the fourth packet to the processor; or process the fourth packet based on the second functional feature to obtain a fifth packet, and send the fifth packet to the processor or the first processing chip. This possible design provides a transmission path for the packet processed by the first processing chip.

In a possible design, the processor is further configured to generate the first packet, where the first packet includes indication information, and the indication information indicates whether the first packet needs to be processed based on the second functional feature; and the second processing chip is further configured to: when the indication information indicates that the first packet needs to be processed based on the second functional feature, process the first packet based on the second functional feature to obtain the second packet; or when the indication information indicates that the first packet does not need to be processed based on the second functional feature, send the first packet to the first processing chip. Therefore, the second processing chip can directly select a packet transmission path based on the indication information in the packet sent by the processor.

In a possible design, the first packet carries a logical address of the second processing chip, and there is a correspondence between the logical address of the second processing chip and a physical address of the first processing chip; the second processing chip is further configured to: when the indication information indicates that the first packet does not need to be processed based on the second functional feature, replace the logical address that is of the second processing chip and that is carried in the first packet with the physical address that is of the first processing chip and that is corresponding to the logical address of the second processing chip to obtain a sixth packet; and send the sixth packet to the first processing chip; and the first processing chip is further configured to receive the sixth packet. This possible design provides a method for sending the packet by the second processing chip to the first processing chip.

In a possible design, the processor is further configured to identify a processing chip in the server, to obtain the correspondence between the logical address of the second processing chip and the physical address of the first processing chip. The process may be implemented in a power-on process of the server.

In a possible design, the processor is further configured to identify processing chips in the server, and the identified processing chips includes the first processing chip and the second processing chip. The process may be implemented in a power-on process of the server. The possible design may be applicable to a logical topology shown in FIG. 3A or FIG. 3C.

In a possible design, the processor is further configured to identify a processing chip in the server, and the identified processing chip includes the second processing chip but does not include the first processing chip. The process may be implemented in a power-on process of the server. The possible design may be applicable to a logical topology shown in FIG. 3B.

In a possible design, the second processing chip is further configured to: after a received packet sent by the first processing chip is processed based on the second functional feature, if the processed packet needs to be sent to the processor, convert a protocol format of the packet from a first format to a second format. The first format is a protocol that needs to be followed for packet transmission between the second processing chip and the first processing chip. The second format is a protocol that needs to be followed for packet transmission between the second processing chip and the processor.

In a possible design, the second processing chip is further configured to: after a received packet sent by the processor is processed based on the second functional feature, if the processed packet needs to be sent to the first processing chip, convert a protocol format of the packet from a second format to a first format. For definitions of the first format and the second format, refer to the foregoing description.

According to a second aspect, a packet transmission method is provided, applicable to a second processing chip in a server. The server further includes a processor and a first processing chip, the second processing chip is separately connected to the processor and the first processing chip, the first processing chip is a non-programmable chip, the second processing chip is a programmable chip, the second processing chip supports a second functional feature. The method includes: receiving a first packet sent by the processor or the first processing chip; processing the first packet based on the second functional feature to obtain a second packet; and sending the second packet to the first processing chip or the processor.

In a possible design, the sending the second packet to the first processing chip or the processor includes: if the second packet carries identification information of the first processing chip or information about a functional feature supported by the first processing chip, sending the second packet to the first processing chip; or if the second packet carries information about the processor, sending the second packet to the processor.

In a possible design, when the first packet is a packet sent by the processor, before the processing the first packet based on the second functional feature to obtain a second packet, the method further includes: parsing the first packet to obtain indication information, where the indication information indicates whether the first packet needs to be processed based on the second functional feature; and the processing the first packet based on the second functional feature to obtain a second packet includes: when the indication information indicates that the first packet needs to be processed based on the second functional feature, processing the first packet based on the second functional feature to obtain the second packet.

In a possible design, the method further includes: when the indication information indicates that the first packet does not need to be processed based on the second functional feature, sending the first packet to the first processing chip.

In a possible design, the first packet carries a logical address of the second processing chip, and there is a correspondence between the logical address of the second processing chip and a physical address of the first processing chip; and when the indication information indicates that the first packet does not need to be processed based on the second functional feature, the sending the first packet to the first processing chip includes: when the indication information indicates that the first packet does not need to be processed based on the second functional feature, replacing the logical address that is of the second processing chip and that is carried in the first packet with the physical address that is of the first processing chip and that is corresponding to the logical address of the second processing chip to obtain a third packet; and sending the third packet to the first processing chip.

In a possible design, the first processing chip is an ASIC chip, and the second processing chip is an FPGA chip.

In a possible design, the method further includes: after a received packet sent by the first processing chip is processed based on the second functional feature, if the processed packet needs to be sent to the processor, converting a protocol format of the packet from a first format to a second format. The first format is a protocol that needs to be followed for packet transmission between the second processing chip and the first processing chip. The second format is a protocol that needs to be followed for packet transmission between the second processing chip and the processor.

In a possible design, the method further includes: after a received packet sent by the processor is processed based on the second functional feature, if the processed packet needs to be sent to the first processing chip, converting a protocol format of the packet from a second format to a first format. For definitions of the first format and the second format, refer to the foregoing description.

For beneficial effects of any technical solution provided in the second aspect, refer to beneficial effects of the corresponding technical solution provided in the first aspect. Details are not described herein again. In addition, it should be noted that, to make descriptions clear and concise, packets in the first aspect and the second aspect are numbered from the first packet, but meanings of the packets are different, which does not affect user's understanding of the technical solutions provided in this specification. In addition, in the following specific implementation, numbering is also performed from the first packet. This is uniformly described herein, and details are not described below again.

According to a third aspect, a processing chip is provided and may be configured to perform any method provided in the second aspect.

In a possible design, the processing chip may be divided into functional modules based on any method provided in the second aspect. For example, each functional module may be obtained through division based on a corresponding function, or at least two functions may be integrated into one processing module.

In a possible design, the processing chip may include a memory and a processor. The memory is configured to store a computer program, and the processor is configured to invoke the computer program, to perform any method provided in the second aspect. For example, the processing chip may be a programmable chip, such as an FPGA chip.

According to a fourth aspect, a computer-readable storage medium is provided. The computer-readable storage medium includes an instruction. When the instruction is run on a computer, the computer is enabled to perform any method provided in the second aspect.

According to a fifth aspect, a computer program product is provided. When the computer program product runs on a computer, any method provided in the second aspect is performed.

Any processing chip, computer-readable storage medium, or computer program product provided above is configured to perform a corresponding method provided above. Therefore, for beneficial effects that can be achieved by the processing chip, computer-readable storage medium, or computer program product, refer to beneficial effects in the corresponding method. Details are not described herein again.

DESCRIPTION OF EMBODIMENTS

Figure 1:
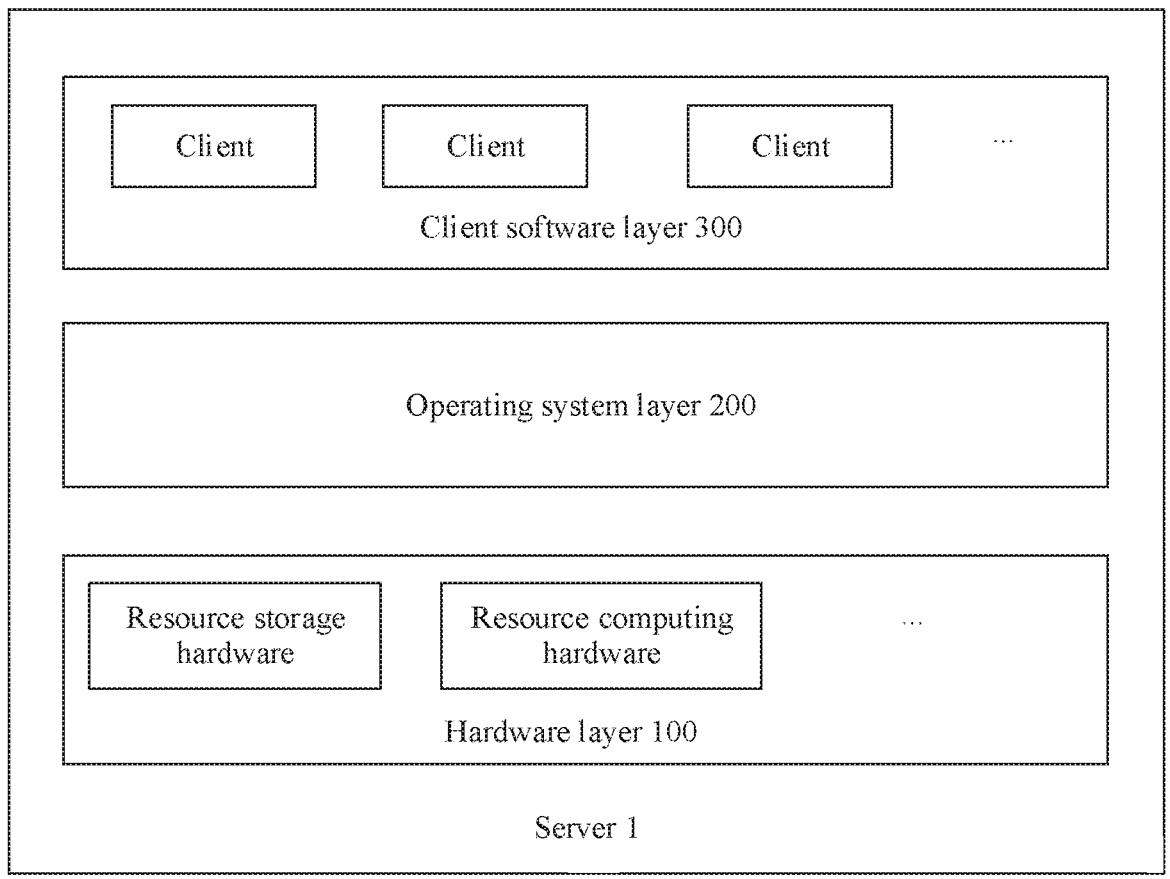
FIG. 1 is a schematic diagram of a structure to which a server is applicable according to an embodiment.

FIG. 1 is a schematic diagram of a structure to which a server 1 is applicable according to an embodiment. The structure of the server 1 may include a hardware layer 100, an operating system layer 200, and a client software layer 300 from bottom to top. The hardware layer 100 may include resource storage hardware (such as a memory) and resource computing hardware (such as a processor, and a processing chip), and the like. The operating system layer 200 may include a program for managing a hardware resource and a software resource. The client software layer 300 may include one or more clients. When the client needs to complete some operations, for example, gaining access to a storage resource by using a remote device that is interconnected to the server 1 and a network, the client initiates the access to the hardware layer 100. In this access process, a corresponding packet is generated. In an example, a packet transmission method may be considered as a packet transmission method in a process of processing a packet sent by the hardware layer 100. In other words, the packet transmission method may be a packet transmission method between components at the hardware layer 100.

Figure 2:
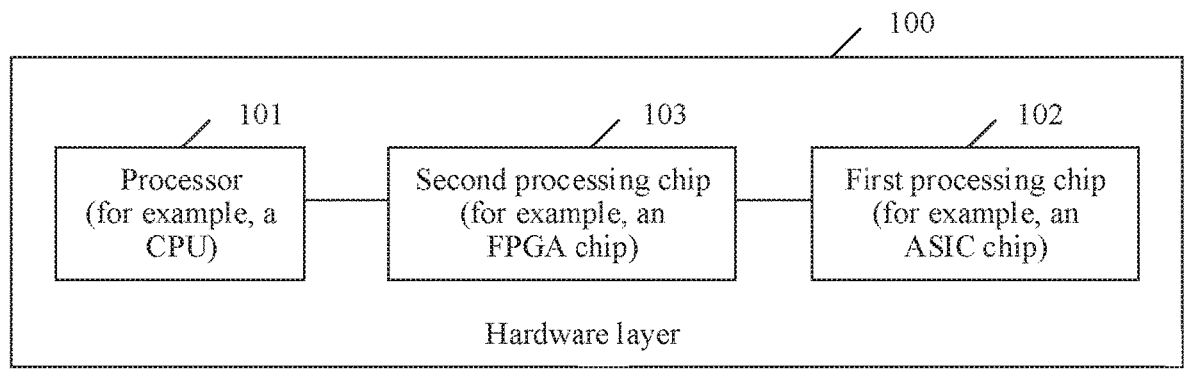
FIG. 2 is a schematic diagram of a structure of resource processing hardware at a hardware layer according to an embodiment.

FIG. 2 is a schematic diagram of a structure of the resource processing hardware at the hardware layer 100 according to this embodiment. Specifically, the hardware layer 100 may include a processor 101, a first processing chip 102, and a second processing chip 103 separately connected to the processor 101 and the first processing chip 102. The processor 101 is a control center of a server.

For example, the processor 101 may be a chip/component capable of software processing, such as a central processing unit (CPU), a system on chip (SOC), or a digital signal processor (DSP). The processor 101 may run a basic input/ output system (BIOS) and an operating system (OS). The BIOS is the most basic software code loaded on a computer hardware system. The BIOS is a bottom-layer software program on the OS, and an abstraction layer between computer hardware and the OS, which is configured to configure a hardware parameter to prepare for OS running. Main functions of the BIOS are power-on, self-check, CPU initialization, memory initialization, input and output device detection, bootable device detection, OS booting, and the like.

The first processing chip 102 is a non-programmable chip. In other words, once a functional feature of the first processing chip 102 is determined, the functional feature cannot be changed again. For example, the first processing chip 102 may be an ASIC chip, such as a network controller chip, a storage controller chip, or an artificial intelligence (AI) operation chip.

The second processing chip 103 is a programmable chip. In other words, the second processing chip 103 can be programmed to update (for example, add, delete, or modify) a functional feature of the second processing chip 103. For example, the second processing chip 103 may be an FPGA chip, a programmable logic component (PLD), and the like.

When the server needs to perform a task (for example, a floating-point computing task), if the task is performed by the CPU, a large quantity of CPU computing resources need to be consumed. To reduce costs of the CPU computing resource, when identifying the task, the CPU may deliver the task to a processing chip externally connected to the CPU. After performing the task, the processing chip returns a performing result of the task to the CPU. In this embodiment, the externally connected chip is the first processing chip 102 and/or the second processing chip 103.

Optionally, both the processor 101 and the second processing chip 103, and the second processing chip 103 and the first processing chip 102 may be interconnected by using a Peripheral Component Interconnect Express (PCIE) bus, an Ultra Path Interconnect (UPI) bus, a cache coherent interconnect for accelerators (CCIX) bus, or the like.

It should be noted that the hardware layer 100 shown in FIG. 2 is merely an example, and does not limit a hardware structure to which a server is applicable in the embodiments. In an actual implementation, the server may further include more or fewer components than those shown in FIG. 2. For example, the server may further include a memory, an interface, a bus, and the like. The memory may be configured to store computer program code, and the processor 101 may invoke the computer program code, to perform steps performed by the processor 101 (for example, the CPU) in this embodiment. The interface is used for communication between the server and a device outside of the server. The bus is configured to connect a component inside the server, for example, configured to connect the memory, the processor 101, the first processing chip 102, the second processing chip 103, and the like.

At the hardware layer 100 shown in FIG. 2, the programmable second processing chip 103 is added between the processor 101 and the non-programmable first processing chip 102. This helps prolong a life cycle of the first processing chip 102. Specifically, the first processing chip 102 is non-programmable. Therefore, in an existing technical solution in which the processor 101 is directly connected to the non-programmable first processing chip 102, to adapt to a new service scenario, the first processing chip 102 has a comparatively short life cycle. In other words, the first processing chip 102 is quickly phased out. When the server shown in FIG. 2 is used, the second processing chip 103 may be programmed to adapt to the new service scenario. There is no need to phase out the first processing chip 102. Therefore, the life cycle of the first processing chip 102 may be prolonged. Further, compared with a technical solution of "replacing with a new first processing chip 102 to adapt to the new service scenario", the second processing chip 103 can be more quickly programmed to adapt to the new service scenario, and costs are comparatively low.

In addition, based on the server shown in FIG. 2, after development of the first processing chip 102 is completed, the second processing chip 103 is programmed to help research and development of a next generation first processing chip 102. Specifically, the second processing chip 103 can be programmed to perform verification in a research and development process of the next generation first processing chip 102, to shorten a verification cycle of the next generation first processing chip 102.

A connection relationship among the processor 101, the first processing chip 102, and the second processing chip 103 in FIG. 2 is a physical connection. In a logical connection (namely, a logical topology), the connection relationship among the processor 101, the first processing chip 102, and the second processing chip 103 may be shown in FIG. 3A to FIG. 3C. In other words, a physical communications architecture (a server architecture shown in FIG. 2) provided in this embodiment may support a plurality of logical communication manners. This can enable one physical communications architecture to adapt to a plurality of application scenarios. The following describes various logical topologies by using an example in which the processor 101, the first processing chip 102, and the second processing chip 103 are respectively the CPU, the ASIC chip, and the FPGA chip.

Figure 3A:
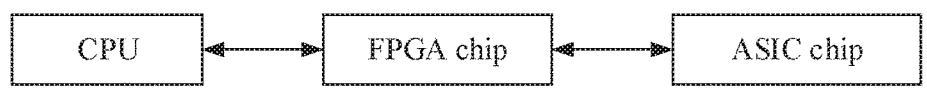
FIG. 3A to FIG. 3C are schematic diagrams of connection relationships among a processor, a first processing chip, and a second processing chip according to an embodiment.

In FIG. 3A, the CPU can identify the ASIC chip and the FPGA chip. In this logical topology, the FPGA chip between the CPU and the ASIC chip functions as a switching chip, to transparently transmit a simple packet, or parse, process, and reorganize a complex packet, or the like. The logical topology may be used to implement a single-root input/output virtualization (SR-IOV) feature, or the like.

Figure 3B:

In FIG. 3B, the CPU can identify the FPGA chip, but cannot identify the ASIC chip. In this logical topology, the FPGA chip may present a required device form to the CPU based on a service requirement, for example, a virtual input/output (VirtIO) device, or a NVM Express (NVMe) device currently popular in the industry. The ASIC chip may be any type of component that can communicate with the FPGA chip. In the logical topology, there is no need to care about a type or model of the ASIC chip for the CPU. Therefore, when upper-layer software of the server has a comparatively high requirement on compatibility, the logical topology has an obvious advantage. For example, the logical topology may be selected for a scenario to which a virtual machine of cloud computing is applicable.

Figure 3C:
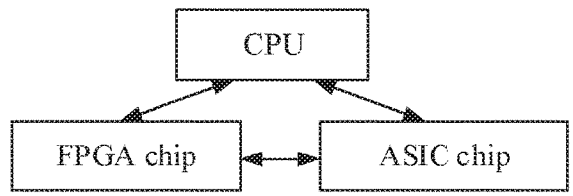

In FIG. 3C, the ASIC chip and the FPGA chip are in a parallel relationship. The ASIC chip and the FPGA chip can run comparatively independent functional features. Packets processed by the ASIC chip and the FPGA chip may be exchanged through a physical channel between the ASIC chip and the FPGA chip. This logical topology may be applied to a scenario to which heterogeneous computing is applicable. In the application scenario, the FPGA chip and the ASIC chip may be two components comparatively independent of each other, to perform comparatively less correlated work. For example, the ASIC chip is mainly used to process conventional service data. For example, if the ASIC chip is a network adapter, the ASIC chip is responsible for controlling traffic entering and leaving a system, or if the ASIC chip is a storage controller card, the ASIC is responsible for managing data storage, such as a redundant array of independent disks (RAID) function. The FPGA chip is mainly used for functions such as data computing, to reduce costs of the CPU computing resource.

Figure 4A:
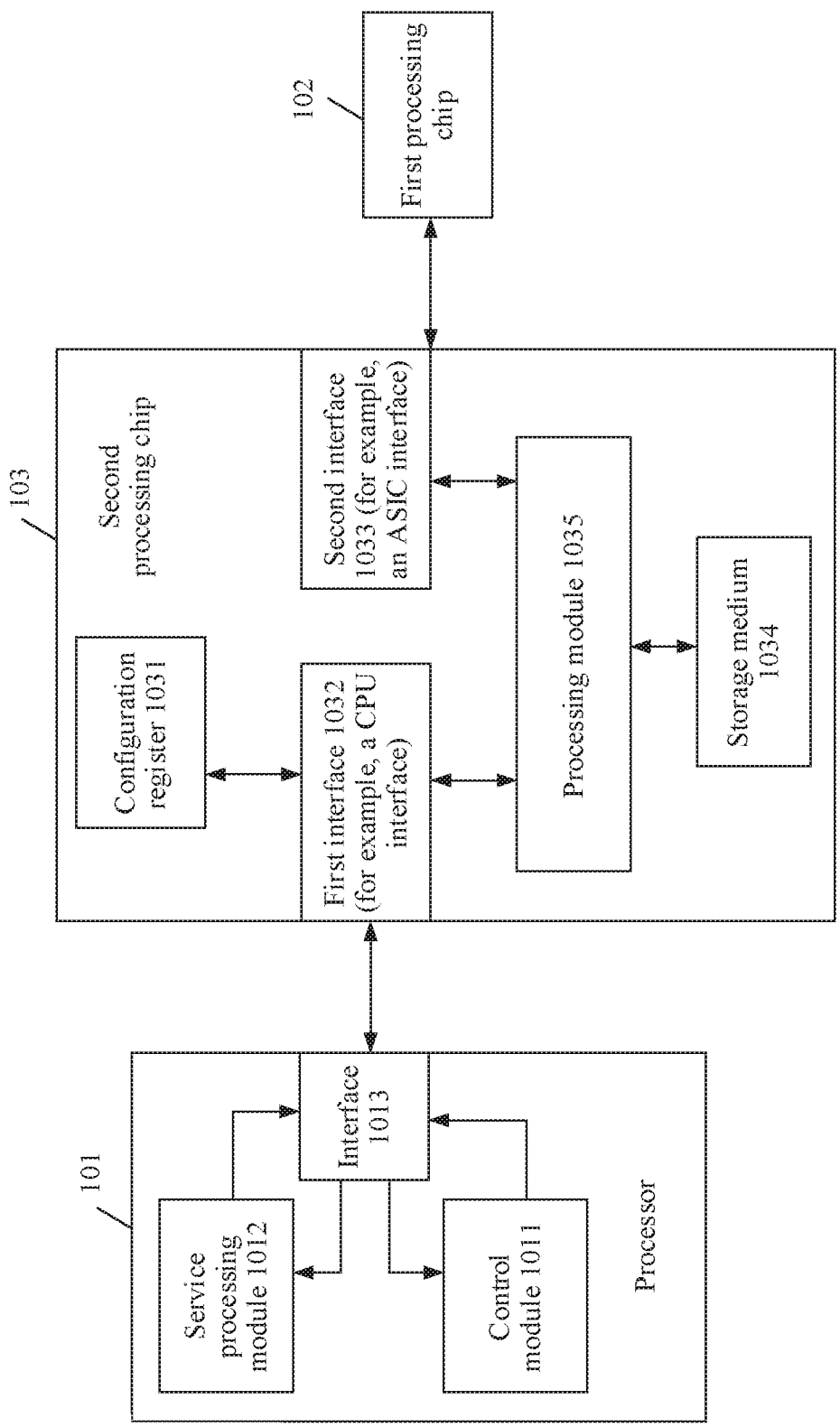
FIG. 4A is a schematic diagram of a structure of a server based on FIG. 2 according to an embodiment.

FIG. 4A is a schematic diagram of a structure of another server provided based on FIG. 2. FIG. 4A shows a structure of the second processing chip 103.

Specifically, the second processing chip 103 may include a configuration register 1031, a first interface 1032, a second interface 1033, a storage medium 1034, and a processing module 1035. The configuration register 1031 is configured to store related information of an identification interface and an identification device, and the like. For a specific example, refer to the following description.

The first interface 1032 is configured to perform communication between the second processing chip 103 and the processor 101. When the processor 101 is the CPU, the first interface 1032 may be referred to as a CPU interface.

The second interface 1033 is configured to perform communication between the second processing chip 103 and the first processing chip 102. When the first processing chip 102 is the ASIC chip, the second interface 1033 may be referred to as an ASIC interface.

The storage medium 1034 is configured to store a computer program. In an example, the storage medium 1034 may include the configuration register 1031. For a function of the configuration register 1031, refer to the following description. Details are not described herein.

Figure 4B:
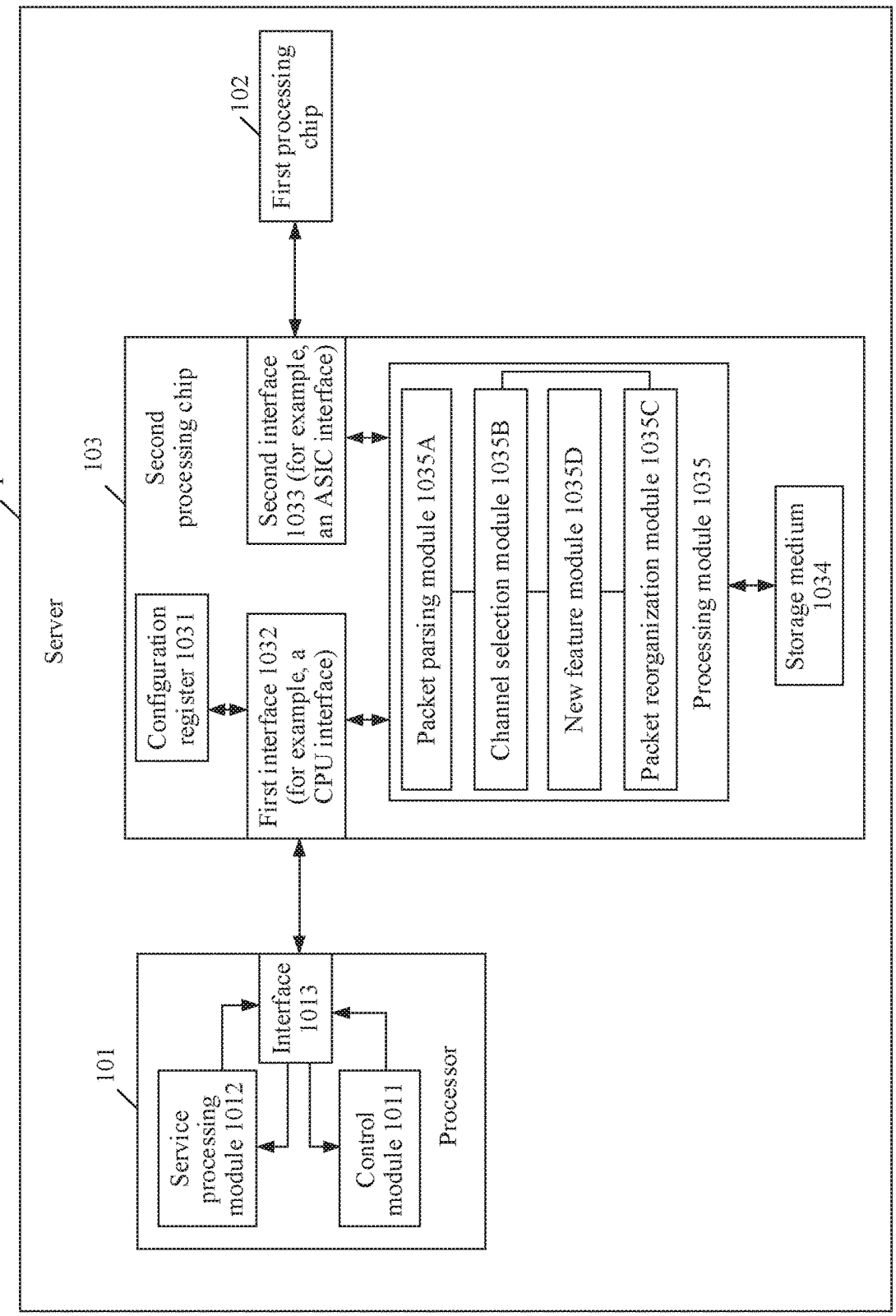
FIG. 4B is a schematic diagram of a structure of another server based on FIG. 2 according to an embodiment.

The processing module 1035 may be a processing circuit, or the like, configured to invoke the computer program, to perform steps performed by the second processing chip 103 (for example, an FPGA chip) in the technical solutions provided in the embodiments, for example, parsing, forwarding, processing, and reorganizing a packet. In an example, as shown in FIG. 4B, the processing module 1035 may include a packet parsing module 1035A, a channel selection module 1035B, a packet reorganization module 1035C, and a new feature module 1035D, respectively configured to parse the packet, select a channel, and reorganize the packet, and process a new functional feature. It should be noted that the new functional feature of the new feature module 1035D indicates a new functional feature of the second processing chip 103 compared with the first processing chip 102. For example, when a chip externally connected to the processor 101 (for example, the CPU) has an RoCE v2 (namely, an RoCE version 2) feature, and the first processing chip 102 (for example, the ASIC chip) has an RoCE v1 (namely, an RoCE version 1) feature, the new functional feature of the second processing chip 103 (for example, the FPGA chip) is a functional feature of the RoCE v2 upgraded from the RoCE v1.

FIG. 4A further shows a schematic diagram of a structure of the processor 101. Specifically, the processor 101 may include a control module 1011, a service processing module 1012, and an interface 1013. The interface 1013 is configured to send and receive a service packet. The control module 1011 is configured to complete a read/write operation on the configuration register 1031, to implement interconnection between the second processing chip 103 and the processor 101. The service processing module 1012 is configured to process a packet received through the interface 1013, and send the processed packet to the second processing chip 103 through the interface 1013, and the like.

It should be noted that the schematic diagrams of both the structure of the processor 101 and the structure of the second processing chip 103 shown in FIG. 4A are examples, and do not constitute a limitation on structures of the processor 101 and the second processing chip 103 to which the embodiments are applicable. In an actual implementation, the processor 101 and the second processing chip 103 may include more or fewer components than those shown in FIG. 4A.

The following describes in detail the technical solutions provided in the embodiments with reference to the accompanying drawings.

The technical solution provided in the embodiments is adding an FPGA chip between a CPU and an ASIC chip, so that the FPGA chip can perform some functional features presented by the CPU to a client, and the ASIC chip can perform the other functions presented by the CPU to the client. Compared with another solution in which only the ASIC chip or only the FPGA chip performs the functional feature presented by the CPU to the client, this solution helps decrease a development cycle (or costs) and improve operating performance of a chip externally connected to the CPU, and improve overall performance of a server. The ASIC chip herein may be expanded to a first processing chip 102, and the FPGA chip may be expanded to a second processing chip 103.

The following describes a power-on procedure and a packet transmission procedure of the server shown in FIG. 2, to illustrate that the server shown in FIG. 2 can be implemented. The power-on procedure is performed before the packet transmission procedure, and is used to prepare for packet transmission. The following uses an example in which the processor 101 is the CPU, the first processing chip is the ASIC chip, and the second processing chip is the FPGA chip for description.

Figure 5:
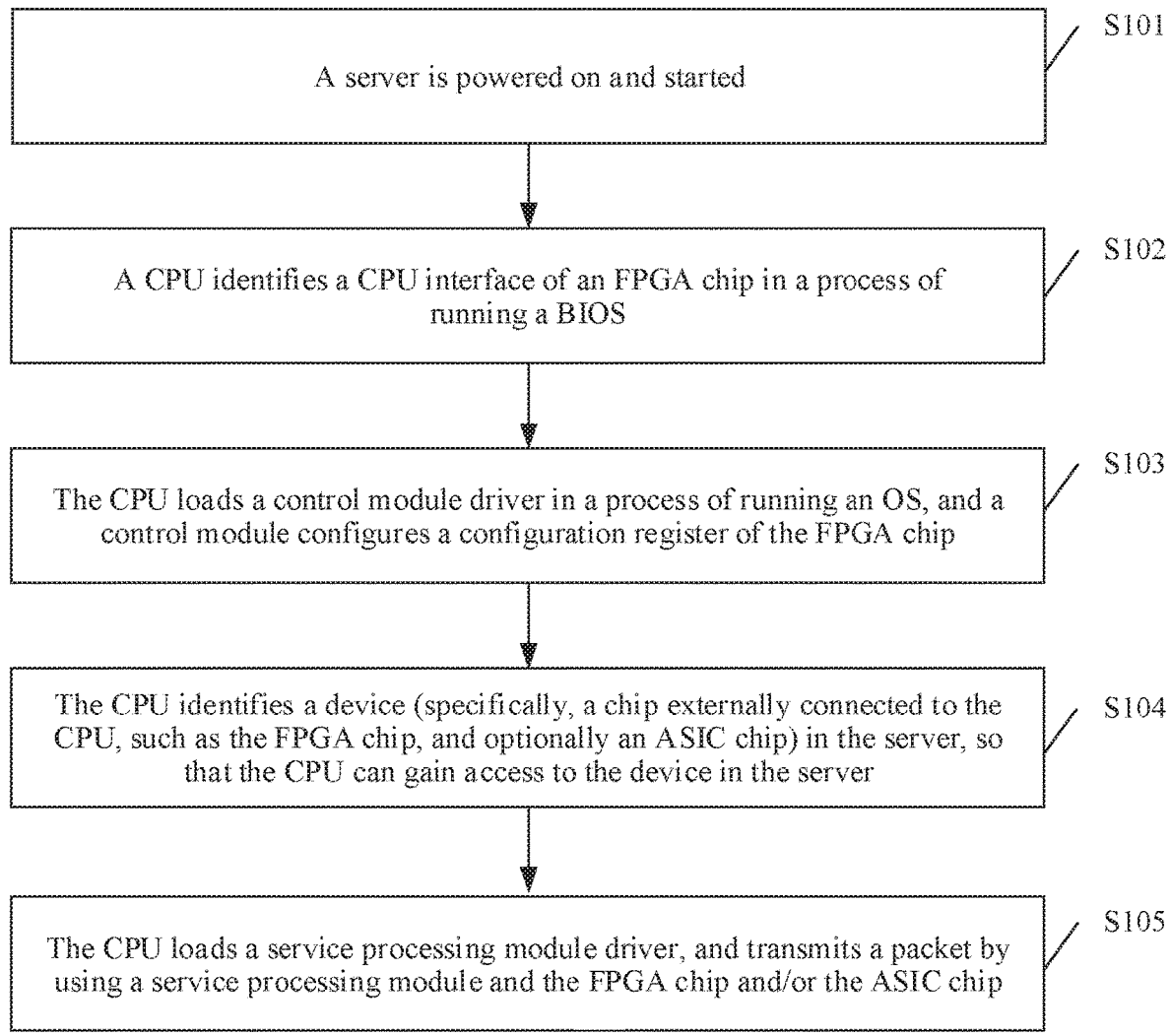
FIG. 5 is a schematic diagram of a power-on procedure of a server according to an embodiment.

FIG. 5 is a schematic diagram of a power-on procedure of a server according to an embodiment. For example, the server may be the server shown in FIG. 2, FIG. 4A, or FIG. 4B. The power-on procedure shown in FIG. 5 may include the following steps.

S101: The server is powered on and started. Specifically, the CPU, the FPGA chip, and the ASIC chip in the server are powered on and started.

S102: The CPU identifies a CPU interface of the FPGA chip in a process of running a BIOS.

Specifically, the CPU reads CPU interface information, for example, hardware characteristics such as a bandwidth, an address, and address space stored in a configuration register of the FPGA chip. In other words, a result of identifying the CPU interface of the FPGA chip by the CPU is the CPU interface information stored in the configuration register. The CPU interface information stored in the configuration register may be pre-stored. For example, an FPGA chip developer prewrites the CPU interface information into the configuration register. Certainly, it is not limited thereto.

In the subsequent packet transmission process, the CPU may receive a large quantity of packets. In this case, a quantity of packets transmitted at a time may be determined based on the bandwidth of the CPU interface. Therefore, in the power-on process, the CPU needs to identify the bandwidth of the CPU interface. In the subsequent packet transmission process, the CPU needs to send a packet to the FPGA chip based on the address space of the CPU interface. Therefore, in the power-on process, the CPU needs to identify the address space of the CPU interface. In addition, the identified address indicates an address in the identified address space.

S103: The CPU loads a control module driver in a process of running an OS, and a control module configures the configuration register of the FPGA chip.

To configure the configuration register, the control module writes configuration information into the configuration register. The configuration information may include a current logical topology of the server, a path for the packet in transmission process, and the like.

The current logical topology of the server may be any logical topology in FIG. 3A to FIG. 3C. The logical topology may be related to a current scenario. For example, when the current application scenario is a cloud computing scenario, the current logical topology may be shown in FIG. 3A or FIG. 3B. When the current application scenario is a heterogeneous computing application scenario, the current logical topology may be shown in FIG. 3C.

The path for the packet in the transmission process may include a path 1 and a path 2 that are distinguished based on whether the packet needs to enter a new feature module. The path 1 indicates a path through which the packet does not need to enter the new feature module, namely, a path through which the packet is sent by the CPU to the FPGA chip, and is transparently transmitted to the ASIC chip by using the FPGA chip. The path 2 indicates a path through which the packet needs to enter the new feature module, namely, a path through which the packet is sent by the CPU to the FPGA chip, and needs to be processed by the new feature module of the FPGA chip. Optionally, the path for the packet in the transmission process may further include a path 2A and a path 2B that are distinguished based on different packet sending destinations after a packet is processed by the new feature module. The path 2A is a path through which a packet processed by the new feature module needs to be returned to the CPU. The path 2B is a path through which the packet processed by the new feature module needs to enter the ASIC chip.

S104: The CPU identifies a device (specifically, a chip externally connected to the CPU, such as the FPGA chip, and optionally the ASIC chip) in the server, so that the CPU can gain access to the device in the server.

Specifically, the CPU reads the logical topology stored in the configuration register of the FPGA chip, for example, the logical topology may be the current logical topology configured in the step S103, and then the CPU identifies the device in the server based on the read logical topology.

For example, when the read logical topology is the logical topology shown in FIG. 3A, the CPU reads the configuration register of the FPGA chip, to obtain address information of the FPGA chip and address information of the ASIC chip. In an example, a mapping relationship between the address information of the FPGA chip and the address information of the ASIC chip may be shown in Table 1.

TABLE 1

| Logical address of an FPGA chip | Physical address of an FPGA chip | Physical address of an ASIC chip |
| --- | --- | --- |
| Addresses 1 to 10 | Addresses 1 to 10 | |
| Addresses 11 to 20 | | Addresses 1 to 10 |

Based on Table 1, the device that is in the server and that is identified by the CPU include the FPGA chip and the ASIC chip. Logical addresses of the FPGA chip (namely, an address included in the address space of the CPU interface, and an address presented by the chip externally connected to the CPU to the CPU) are addresses 1 to 20. Logical addresses 1 to 10 respectively correspond to physical addresses 1 to 10 of the FPGA chip, and logical addresses 11 to 20 respectively correspond to physical addresses 1 to 10 of the ASIC chip.

For another example, when the read logical topology is the logical topology shown in FIG. 3B, the CPU reads the configuration register of the FPGA chip, to obtain the address information of the FPGA chip. In an example, the address information of the FPGA chip may be shown in Table 2.

TABLE 2

| Logical address of an FPGA chip |
| --- |
| Addresses 1 to 20 |

It can be learned from Table 2 that the device that is in the server and that is identified by the CPU includes the FPGA chip. Logical addresses of the FPGA chip (namely, the address included in the address space of the CPU interface, and the address presented by the chip externally connected to the CPU to the CPU) are addresses 1 to 20.

In addition, when the read logical topology is the logical topology shown in FIG. 3A, an identification result obtained by the CPU by identifying the device in the server may further include a device type of the FPGA chip, a device type of the ASIC chip, and the like. For another example, when the read logical topology is the logical topology shown in FIG. 3B, the identification result obtained by the CPU by identifying the device in the server may include a device type of the FPGA chip, and the like. The device type may include a network type (for example, a network adapter), and a storage type (for example, a RAID).

S105: The CPU loads a service processing module driver, and transmits a packet by using a service processing module and the FPGA chip and/or the ASIC chip. For a specific implementation process of the step S105, refer to the following description.

Figure 6:
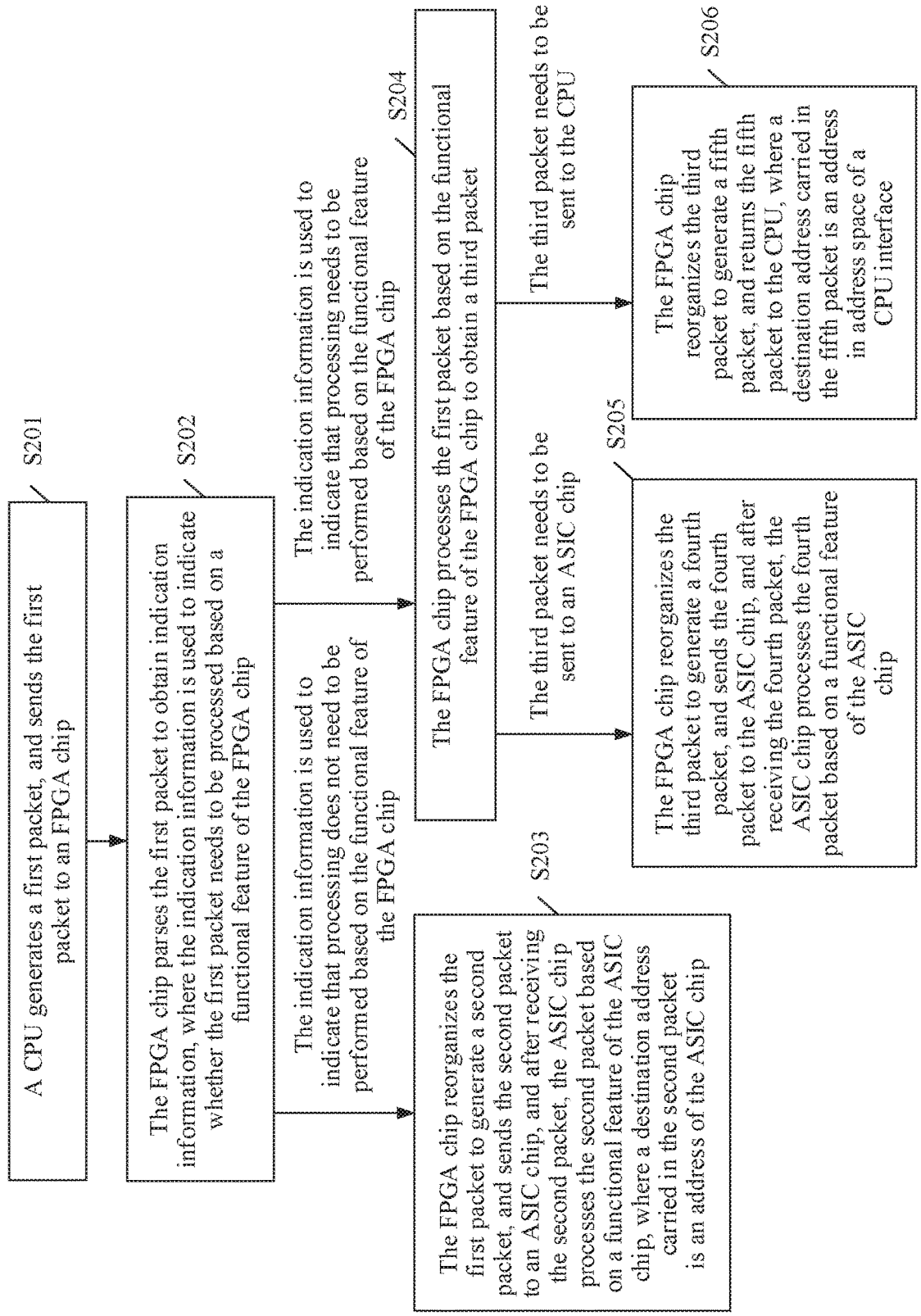
FIG. 6 is a schematic diagram of a packet transmission method according to an embodiment.

FIG. 6 is a schematic diagram of a packet transmission method according to an embodiment. This method specifically describes a method for transmitting a packet sent by a CPU. The method may be applicable to the logical topology shown in FIG. 3A or FIG. 3C. The method may include the following steps.

S201: The CPU generates a first packet, and sends the first packet to an FPGA chip.

S202: The FPGA chip parses the first packet to obtain indication information, where the indication information indicates whether the first packet needs to be processed based on a functional feature of the FPGA chip.

When the indication information indicates that processing does not need to be performed based on the functional feature of the FPGA chip, step S203 is performed.

When the indication information indicates that processing needs to be performed based on the functional feature of the FPGA chip, step S204 is performed.

In an implementation, the indication information may include address information, and the address information is one logical address that is of the FPGA chip and that is identified by the CPU in the power-on process. For example, the address information may be one of the logical addresses 1 to 20 of the FPGA chip shown in Table 1. The FPGA chip may determine, based on a correspondence (the correspondence shown in Table 1) between the logical address and a physical address, whether the physical address corresponding to the logical address is a physical address of the FPGA chip or a physical address of an ASIC chip. If the determined physical address is the physical address of the FPGA chip (for example, when the address information is the logical address 1 in Table 1, the determined physical address corresponding to the logical address is a physical address 1 of the FPGA chip), it indicates that the indication information indicates that the processing needs to be performed based on the functional feature of the FPGA chip. If the determined physical address is the physical address of the ASIC chip (for example, when the address information is the logical address 11 in Table 1, the determined physical address is the physical address 1 of the ASIC chip), it indicates that the indication information indicates that the processing does not need to be performed based on the functional feature of the FPGA chip.

In another implementation, the indication information may be flag bit information, for example, information having functional directivity. For example, when the indication information is "1", the indication information indicates that the first packet needs to be processed based on the functional feature of the FPGA chip. When the indication information is "0", the indication information indicates that the first packet does not need to be processed based on the functional feature of the FPGA chip.

It should be noted that, in a cloud computing application, a virtual machine running on a client is on a hypervisor, and software at a client layer is universal. However, the software hypervisor may be customized. Therefore, when a server deployed in the cloud computing is applicable to this embodiment, the CPU may be improved (specifically, a software program running on the CPU is improved), to generate the packet carrying the indication information.

S203: The FPGA chip reorganizes the first packet to generate a second packet, and sends the second packet to the ASIC chip, and after receiving the second packet, the ASIC chip processes the second packet based on a functional feature of the ASIC chip, where a destination address carried in the second packet is an address of the ASIC chip.

After the step S203 is performed, this packet transmission procedure ends. A method for transmitting a packet sent by the ASIC chip may be subsequently performed, for example, a method shown in FIG. 11.

Specifically, the FPGA chip converts a destination address (namely, the logical address of the FPGA chip) carried in the first packet into the physical address of the ASIC chip, to generate the second packet. For example, based on Table 1, assuming that the destination address carried in the first packet is the address 11, the address 1 is obtained after conversion.

Optionally, a packet format of the first packet is a format of a packet transmitted between the CPU and the FPGA chip. A packet format of the second packet is a format of a packet transmitted between the FPGA chip and the ASIC chip. When the two types of packets have different formats (for example, one is a PCIE packet format, and the other is a UPI packet format), the reorganization in the step S203 may further include conversion between packet formats determined by using protocols supported by different interfaces of the FPGA chip.

Optionally, a packet format of the first packet is a format conforming to a feature of the FPGA chip. A packet format of the second packet is a format conforming to a feature of the ASIC chip. When the two formats are different (for example, the format of the feature of the FPGA chip is an RoCE v2 format, and the format of the feature of the ASIC chip is an RoCE v1 format), the reorganization in the step S203 may further include conversion between packet formats determined by using features supported by different chips.

It should be noted that a specific implementation of packet reorganization in the following is similar to this, and therefore details are not described in the following again.

S204: The FPGA chip processes the first packet based on the functional feature of the FPGA chip to obtain a third packet.

For example, it is assumed that a functional feature of the ASIC chip is an RoCE v1 feature, and the functional feature of the FPGA chip is a feature of an RoCE v2 upgrade from an RoCE v1. In this case, both a functional feature presented by a chip externally connected to the CPU (namely, the ASIC chip and the FPGA chip) to the CPU, and a functional feature presented by the CPU to a client are the RoCE v2 features. Based on this, when the step S204 is performed, the FPGA chip may process the first packet based on the "feature of the RoCE v2 upgraded from the RoCE v1", to obtain the third packet.

For example, a storage medium in the FPGA chip may include one or more instruction registers. Each instruction register is configured to store an instruction for performing one or more functions. Each instruction register has one address. The first packet generated by the CPU carries an address or addresses of the one or more instruction registers. The FPGA chip may determine, according to an address carried in the first packet, an instruction register indicated by the address, and invoke the instruction in the instruction register, to perform a function indicated by the instruction.

When the FPGA chip determines that the third packet needs to be sent to the ASIC chip, step S205 is performed.

When the FPGA chip determines that the third packet needs to be returned to the CPU, step S206 is performed.

The FPGA chip may determine whether a packet needs to be sent to the ASIC chip or returned to the CPU based on feature information of the packet. The FPGA chip can be programmed to enable the FPGA chip to learn of a packet having feature information needs to be sent to the ASIC chip and a packet having feature information needs to be returned to the CPU.

Optionally, if the third packet carries identification information (for example, an IP address) of the ASIC chip, the third packet is sent to the ASIC chip. For example, when the ASIC chip is a network adapter, the first packet generated by the CPU may carry an IP address of the ASIC chip, so that the third packet generated by the FPGA chip based on the first packet carries the IP address of the ASIC chip.

Optionally, if the third packet carries information about a functional feature supported by the ASIC chip, the third packet is sent to the ASIC chip. For example, in a scenario in which a VF is expanded by using the FPGA chip (for a specific example, refer to the following description), because a VF expanded by using the FPGA chip needs to be mapped to a VF of the ASIC chip, the third packet may carry information that "the VF expanded by using the FPGA chip needs to be mapped to the VF in the ASIC chip". Based on this, when the step S204 is performed, the third packet generated by the FPGA chip needs to be sent to the ASIC chip.

Optionally, if the third packet carries CPU information (for example, a memory address that the CPU needs to gain access to), the third packet is sent to the CPU. For example, assuming that direct memory access (DMA) needs to be performed for a plurality of times in a process of performing a function, when step S204 is performed, the third packet generated by the FPGA chip may carry the memory address, and the like, to indicate that the third packet generated by the FPGA chip needs to be returned to the CPU.

For example, it is assumed that the functional feature of the ASIC chip is the RoCE v1 feature, and the functional feature of the FPGA chip is the feature of the RoCE v2 upgraded from the RoCE v1. In this case, when the third packet needs to be processed by using the RoCE v1 feature, it is determined that the third packet needs to be sent to the ASIC chip. When the third packet is still information within a functional range of the RoCE v2 and needs to continue to interact with the CPU, it is determined that the third packet needs to be returned to the CPU.

S205: The FPGA chip reorganizes the third packet to generate a fourth packet, and sends the fourth packet to the ASIC chip, and after receiving the fourth packet, the ASIC chip processes the fourth packet based on a functional feature of the ASIC chip.

After the step S205 is performed, this packet transmission procedure ends. A method for transmitting a packet sent by the ASIC chip may be subsequently performed, for example, a method shown in FIG. 11.

S206: The FPGA chip reorganizes the third packet to generate a fifth packet, and returns the fifth packet to the CPU, where a destination address carried in the fifth packet is an address in address space of a CPU interface.

After the step S206 is performed, this packet transmission procedure ends.

Figure 7:
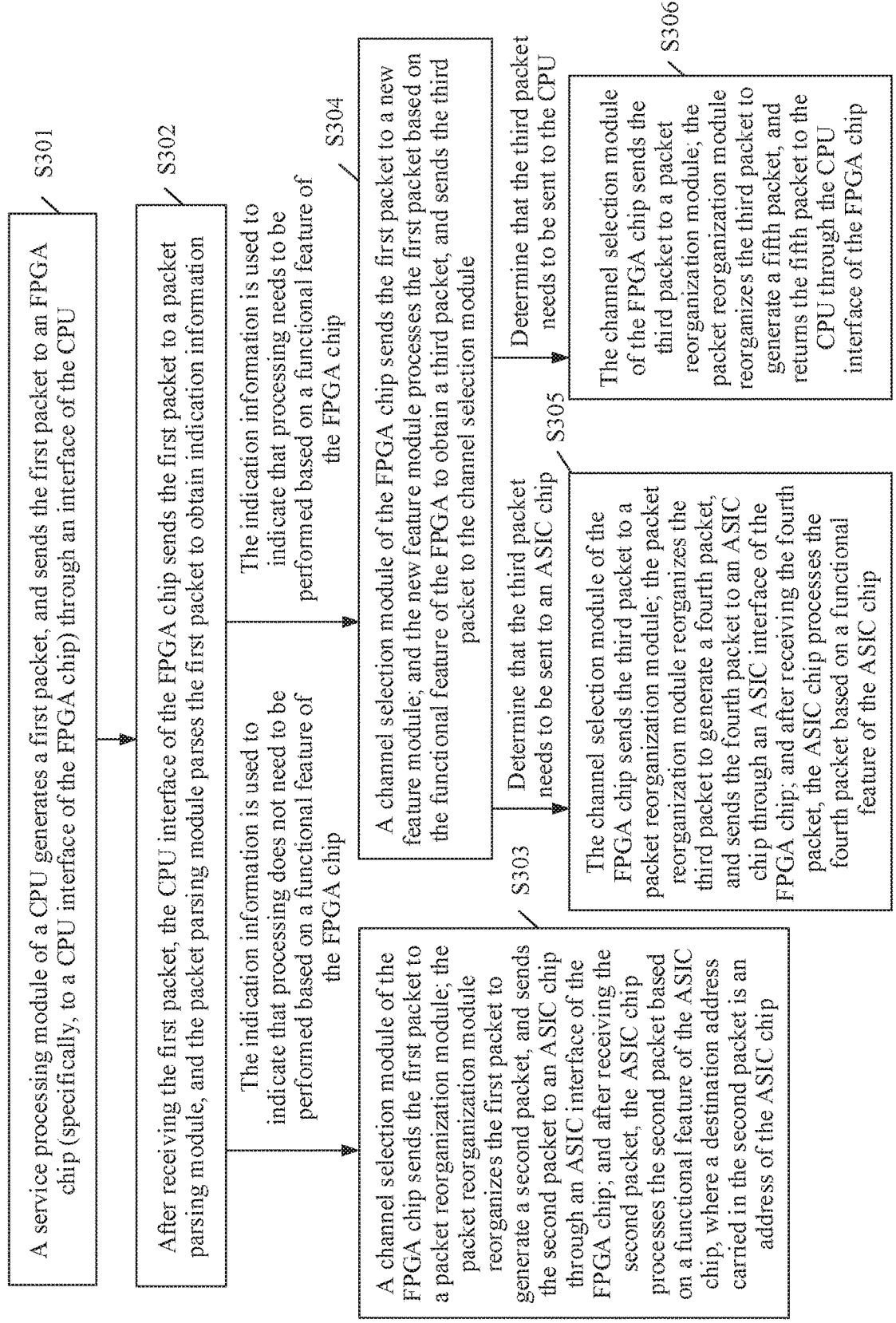
FIG. 7 is a schematic flowchart of a packet transmission method based on FIG. 6 according to an embodiment.

FIG. 7 is a schematic flowchart of another packet transmission method according to an embodiment. The method may be applicable to the server shown in FIG. 4B. Steps S301 to S306 in the method may be separately used as specific implementations of the steps S201 to S206. The method may include the following steps.

S301: A service processing module of a CPU generates a first packet, and sends the first packet to an FPGA chip (specifically, to a CPU interface of the FPGA chip) through an interface of the CPU.

S302: After receiving the first packet, the CPU interface of the FPGA chip sends the first packet to a packet parsing module, and the packet parsing module parses the first packet to obtain indication information. The packet parsing module of the FPGA chip sends the indication information to a channel selection module.

When the indication information indicates that processing does not need to be performed based on a functional feature of the FPGA chip, step S303 is performed.

When the indication information indicates that processing needs to be performed based on a functional feature of the FPGA chip, step S304 is performed.

S303: The channel selection module of the FPGA chip sends the first packet to a packet reorganization module; the packet reorganization module reorganizes the first packet to generate a second packet, and sends the second packet to an ASIC chip through an ASIC interface of the FPGA chip; and after receiving the second packet, the ASIC chip processes the second packet based on a functional feature of the ASIC chip, where a destination address carried in the second packet is an address of the ASIC chip.

Figure 8:
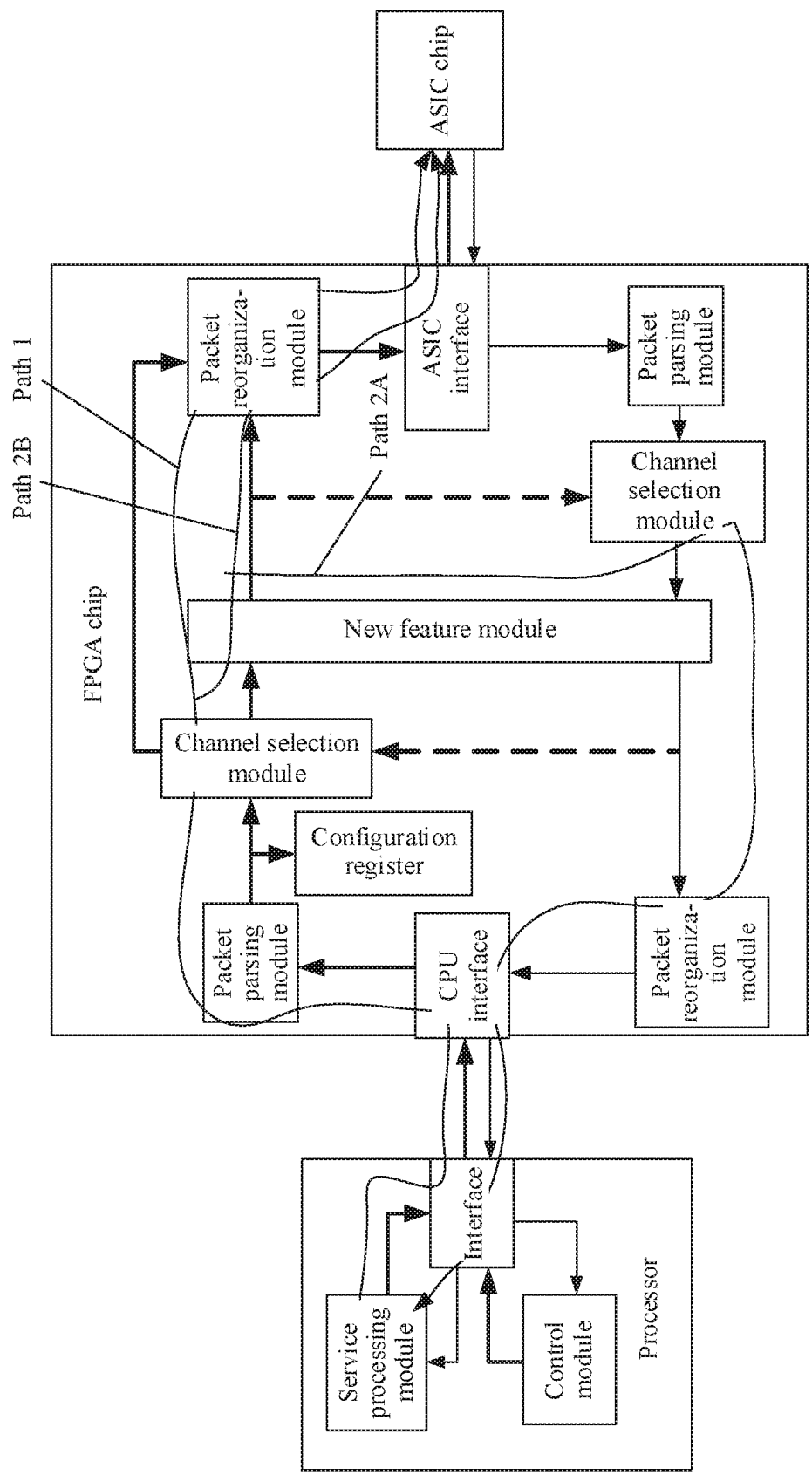
FIG. 8 is a schematic diagram of a packet path based on FIG. 7 according to an embodiment.

After the step S303 is performed, this packet transmission procedure ends. A method for transmitting a packet sent by the ASIC chip may be subsequently performed, for example, a method shown in FIG. 12. In an example, in a process of performing the steps S301 to S303, for a packet path, refer to a path 1 in FIG. 8.

S304: The channel selection module of the FPGA chip sends the first packet to a new feature module; and the new feature module processes the first packet based on the functional feature of the FPGA chip to obtain a third packet, and sends the third packet to the channel selection module.

When the channel selection module determines that the third packet needs to be sent to an ASIC chip, step S305 is performed.

When the channel selection module determines that the third packet needs to be returned to the CPU, step S306 is performed.

Optionally, before or in a process of generating the third packet, if the new feature module determines that the generated third packet needs to be sent to the ASIC chip, the third packet may carry one piece of indication information. The indication information may be address information or a flag bit of the ASIC chip, and the address information or the flag bit of the ASIC chip is used to indicate to send the third packet to the ASIC chip. In this case, the channel selection module may perform step S305 based on the indication information. Correspondingly, if the channel selection module determines that the generated third packet needs to be returned to the CPU, another piece of indication information may be carried in the third packet. The indication information may be address information or a flag bit of a CPU chip, and the address information or the flag bit of the CPU chip is used to indicate to return the third packet to the CPU. In this case, the channel selection module may perform step S306 based on the indication information.

S305: The channel selection module of the FPGA chip sends the third packet to a packet reorganization module; the packet reorganization module reorganizes the third packet to generate a fourth packet, and sends the fourth packet to the ASIC chip through an ASIC interface of the FPGA chip; and after receiving the fourth packet, the ASIC chip processes the fourth packet based on a functional feature of the ASIC chip.

After the step S305 is performed, this packet transmission procedure ends. A method for transmitting a packet sent by the ASIC chip may be subsequently performed, for example, a method shown in FIG. 12. In an example, in a process of performing the steps S301, S303, S304, and S305, for a packet path, refer to a path 2B in FIG. 8.

S306: The channel selection module of the FPGA chip sends the third packet to a packet reorganization module; the packet reorganization module reorganizes the third packet to generate a fifth packet, and returns the fifth packet to the CPU through the CPU interface of the FPGA chip.

After the step S306 is performed, this packet transmission procedure ends. In an example, in a process of performing the steps S301, S303, S304, and S306, for a packet path, refer to a path 2A in FIG. 8.

Figure 9:
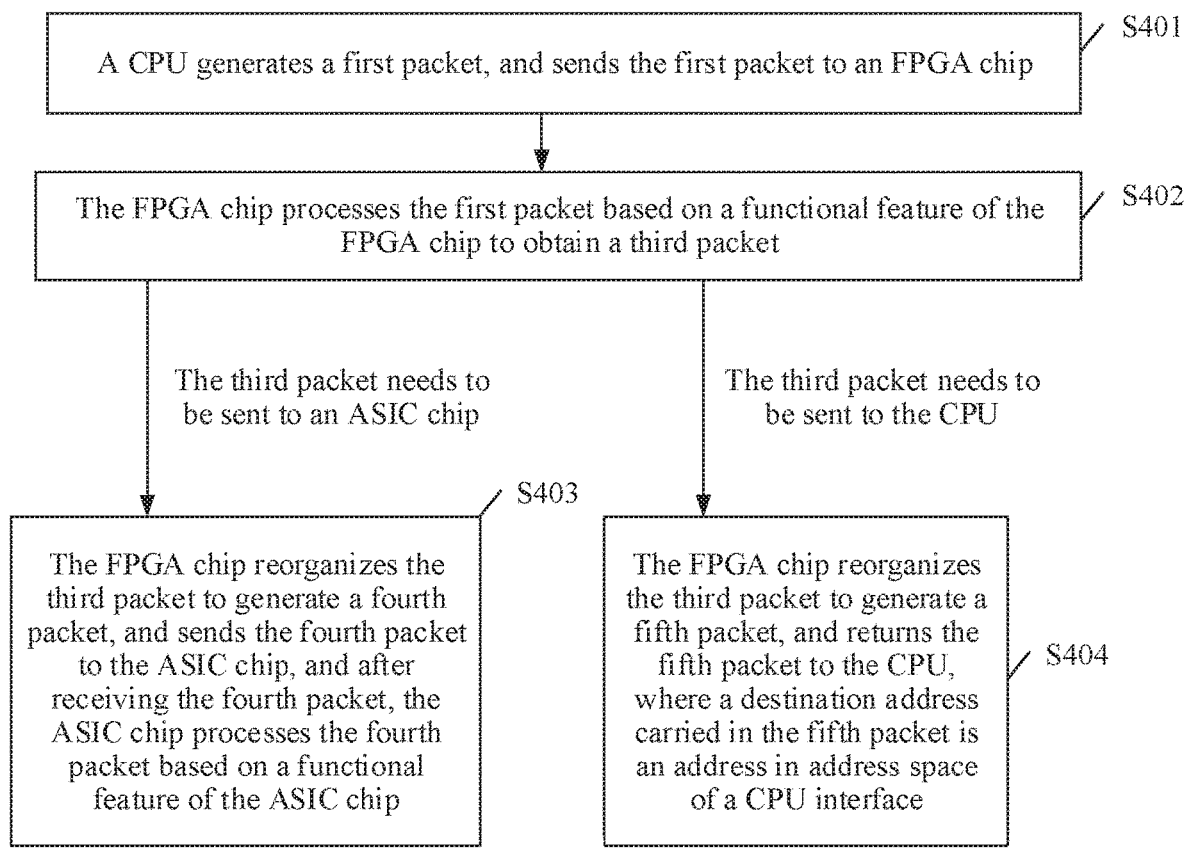
FIG. 9 is a schematic diagram of another packet transmission method according to an embodiment.

FIG. 9 is a schematic diagram of a packet transmission method according to an embodiment. This method specifically describes a method for transmitting a packet sent by a CPU. The method may be applicable to the logical topology shown in FIG. 3B. The method may include the following steps.

S401: The CPU generates a first packet, and sends the first packet to an FPGA chip.

S402: The FPGA chip processes the first packet based on a functional feature of the FPGA chip to obtain a third packet.

If the FPGA chip determines that the third packet needs to be sent to an ASIC chip, step S403 is performed.

If the FPGA chip determines that the third packet needs to be returned to the CPU, step S404 is performed.

S403: The FPGA chip reorganizes the third packet to generate a fourth packet, and sends the fourth packet to the ASIC chip, and after receiving the fourth packet, the ASIC chip processes the fourth packet based on a functional feature of the ASIC chip.

Figure 10:
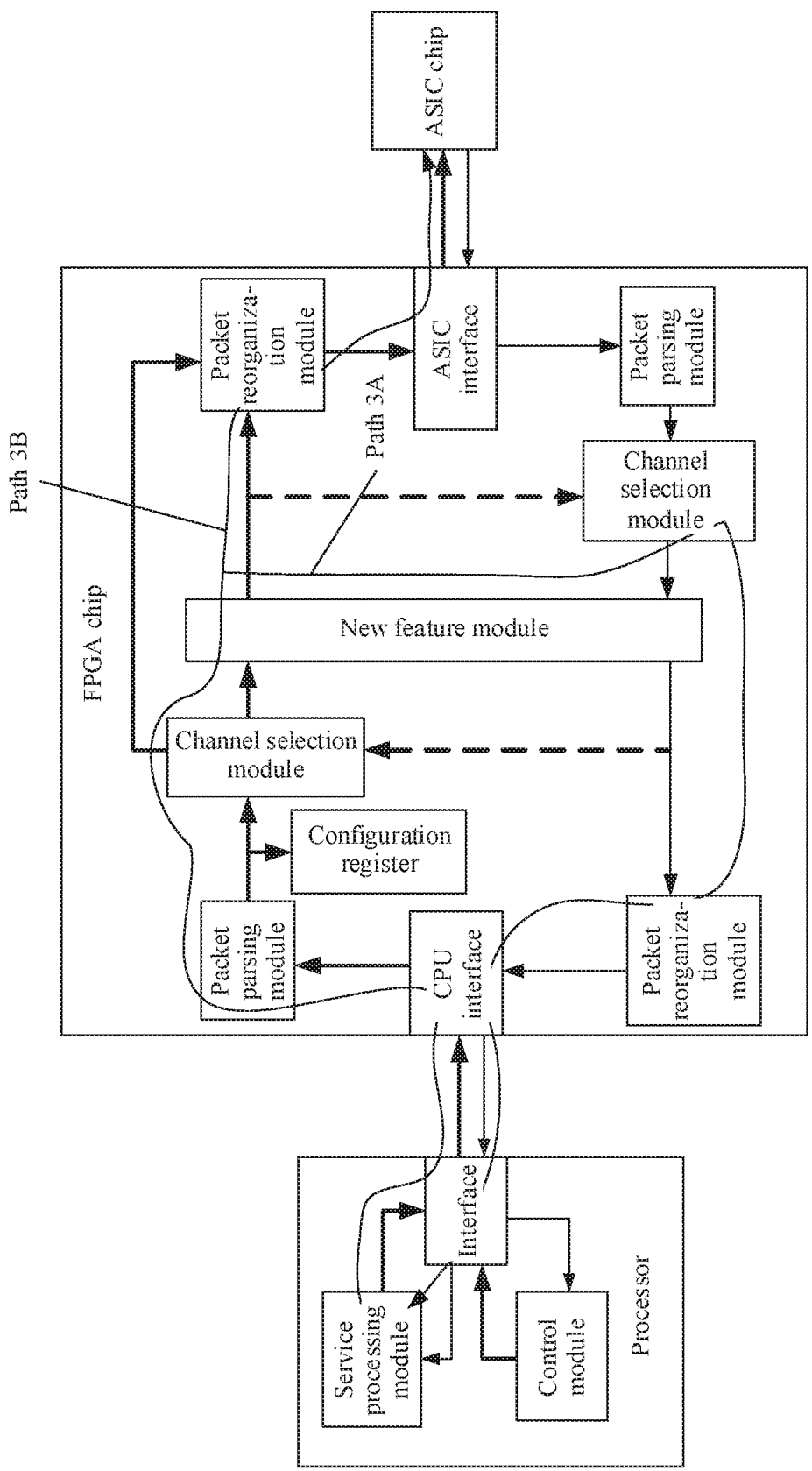
FIG. 10 is a schematic diagram of a packet path based on FIG. 9 according to an embodiment.

After the step S403 is performed, this packet transmission procedure ends. A method for transmitting a packet sent by the ASIC chip may be subsequently performed, for example, a method shown in FIG. 11. In an example, in a process of performing the steps S401 to S403, for a packet path, refer to a path 3B in FIG. 10.

S404: The FPGA chip reorganizes the third packet to generate a fifth packet, and returns the fifth packet to the CPU, where a destination address carried in the fifth packet is an address in address space of a CPU interface.

After the step S404 is performed, this packet transmission procedure ends. In an example, in a process of performing the steps S401, S402, and S404, for a packet path, refer to a path 3A in FIG. 10.

Figure 11:
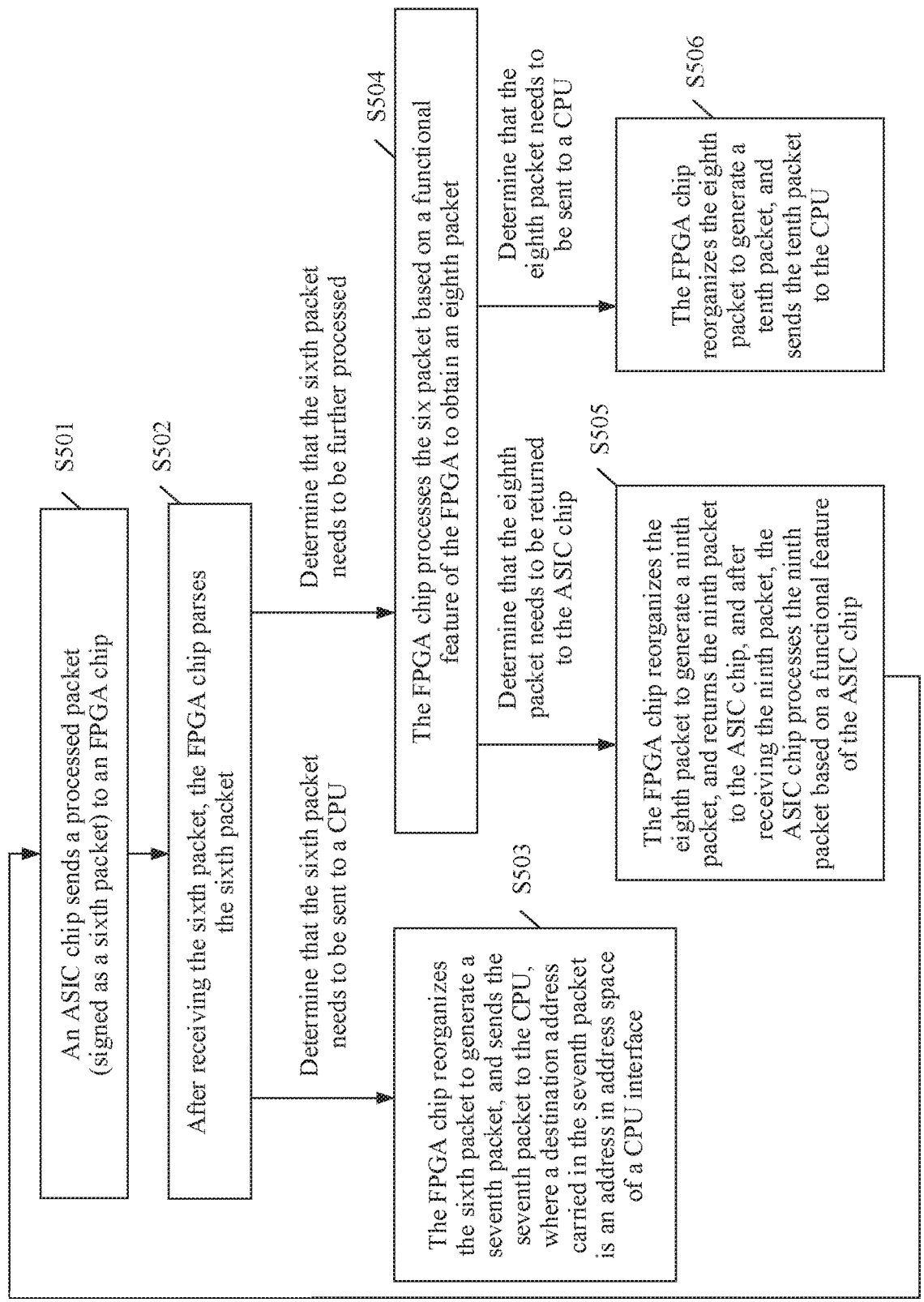
FIG. 11 is a schematic diagram of another packet transmission method according to an embodiment.

FIG. 11 is a schematic diagram of a packet transmission method according to an embodiment. This method specifically describes a method for transmitting a packet sent by an ASIC chip. The method may include the following steps.

S501: The ASIC chip sends a processed packet (signed as a sixth packet) to an FPGA chip.

In an example, with reference to the embodiment shown in FIG. 6, the sixth packet may be a packet obtained after the ASIC chip processes the second packet or the fourth packet based on the functional feature of the ASIC chip.

S502: After receiving the sixth packet, the FPGA chip parses the sixth packet. If the FPGA chip determines, based on information obtained by parsing the sixth packet, that the sixth packet needs to be sent to a CPU, step S503 is performed; or if the FPGA chip determines that the sixth packet needs to be further processed, step S504 is performed.

Whether a packet needs to be sent to the CPU or needs to be further processed by the FPGA chip may be determined based on feature information of the packet. The FPGA chip can be programmed to enable the FPGA chip to learn of a packet having which feature information needs to be sent to the CPU and a packet having which feature information needs to be further processed by the FPGA chip.

For example, it is assumed that a functional feature of the ASIC chip is an RoCE v1 feature, and a functional feature of the FPGA chip is a feature of an RoCE v2 upgraded from an RoCE v1. In this case, when the feature of the RoCE v2 upgraded from the RoCE v1 needs to be added to the sixth packet, it is determined that the sixth packet needs to be further processed; or when the feature of the RoCE v2 upgraded from the RoCE v1 does not need to be added to the sixth packet, it is determined to that the sixth packet is sent to the CPU.

S503: The FPGA chip reorganizes the sixth packet to generate a seventh packet, and sends the seventh packet to the CPU, where a destination address carried in the seventh packet is an address in address space of a CPU interface.

After the step S503 is performed, this packet transmission procedure ends.

S504: The FPGA chip processes the six packet based on a functional feature of the FPGA chip to obtain an eighth packet.

If it is determined that the eighth packet needs to be returned to the ASIC chip, step S505 is performed.

If it is determined that the eighth packet needs to be sent to a CPU, step S506 is performed.

S505: The FPGA chip reorganizes the eighth packet to generate a ninth packet, and returns the ninth packet to the ASIC chip, and after receiving the ninth packet, the ASIC chip processes the ninth packet based on a functional feature of the ASIC chip.

After the step S505 is performed, the packet obtained after processed by the ASIC chip is used as the sixth packet, and is returned to perform step S501.

S506: The FPGA chip reorganizes the eighth packet to generate a tenth packet, and sends the tenth packet to the CPU.

After the step S506 is performed, this packet transmission procedure ends.

Figure 12:
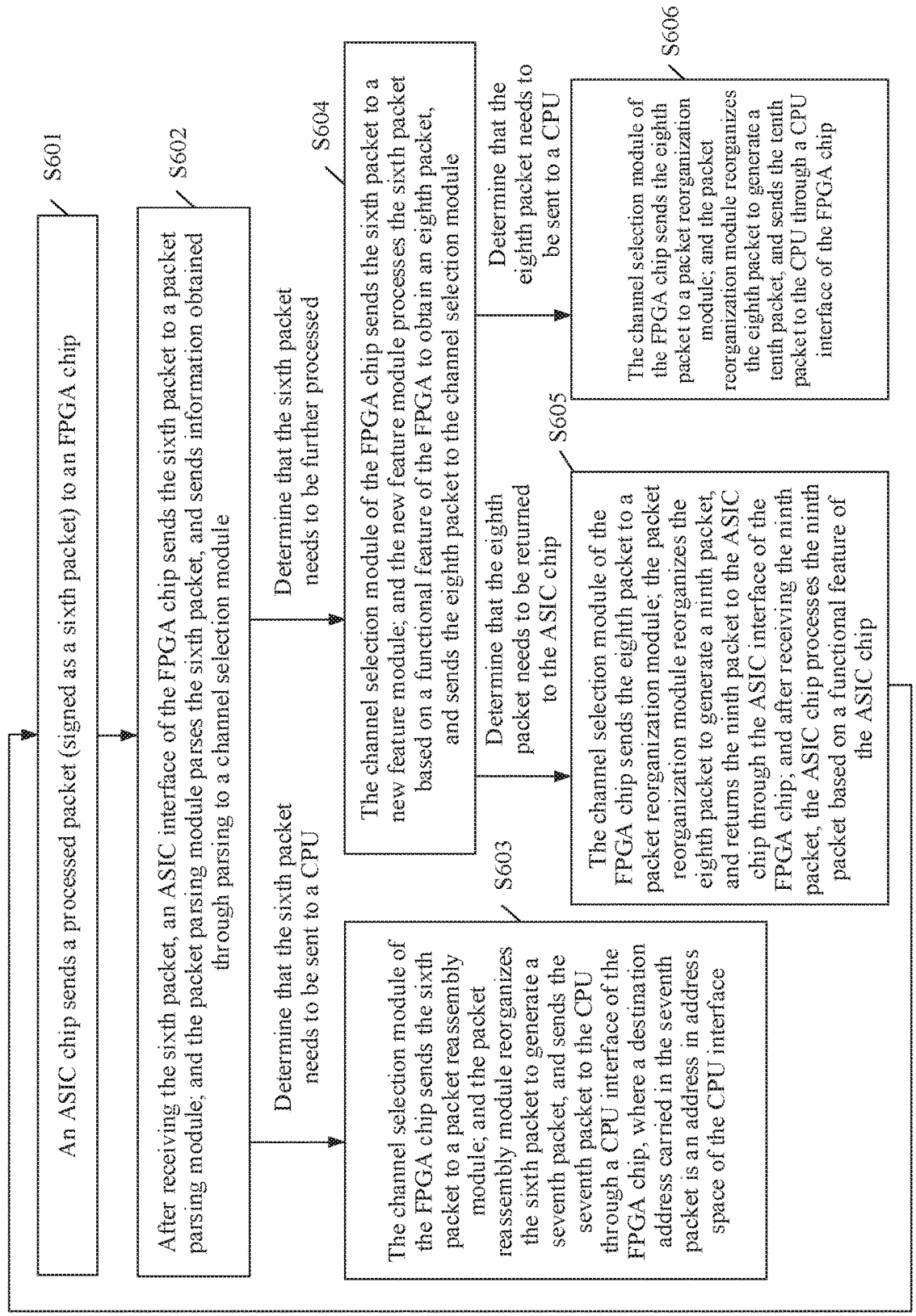
FIG. 12 is a schematic diagram of a packet transmission method based on FIG. 11 according to an embodiment.

FIG. 12 is a schematic flowchart of another packet transmission method according to an embodiment. The method may be applicable to the server shown in FIG. 4B. Steps S601 to S606 in the method may be separately used as specific implementations of the steps S501 to S506. The method may include the following steps.

S601: An ASIC chip sends a processed packet (signed as a sixth packet) to an FPGA chip.

S602: After receiving the sixth packet, an ASIC interface of the FPGA chip sends the sixth packet to a packet parsing module; and the packet parsing module parses the sixth packet, and sends information obtained through parsing to a channel selection module.

If the channel selection module determines, based on the information obtained by parsing the sixth packet, that the sixth packet needs to be sent to a CPU, step S603 is performed; or if the channel selection module determines that the sixth packet needs to be further processed, step S604 is performed.

S603: The channel selection module of the FPGA chip sends the sixth packet to a packet reorganization module; and the packet reorganization module reorganizes the sixth packet to generate a seventh packet, and sends the seventh packet to the CPU through a CPU interface of the FPGA chip, where a destination address carried in the seventh packet is an address in address space of the CPU interface.

Figure 13:
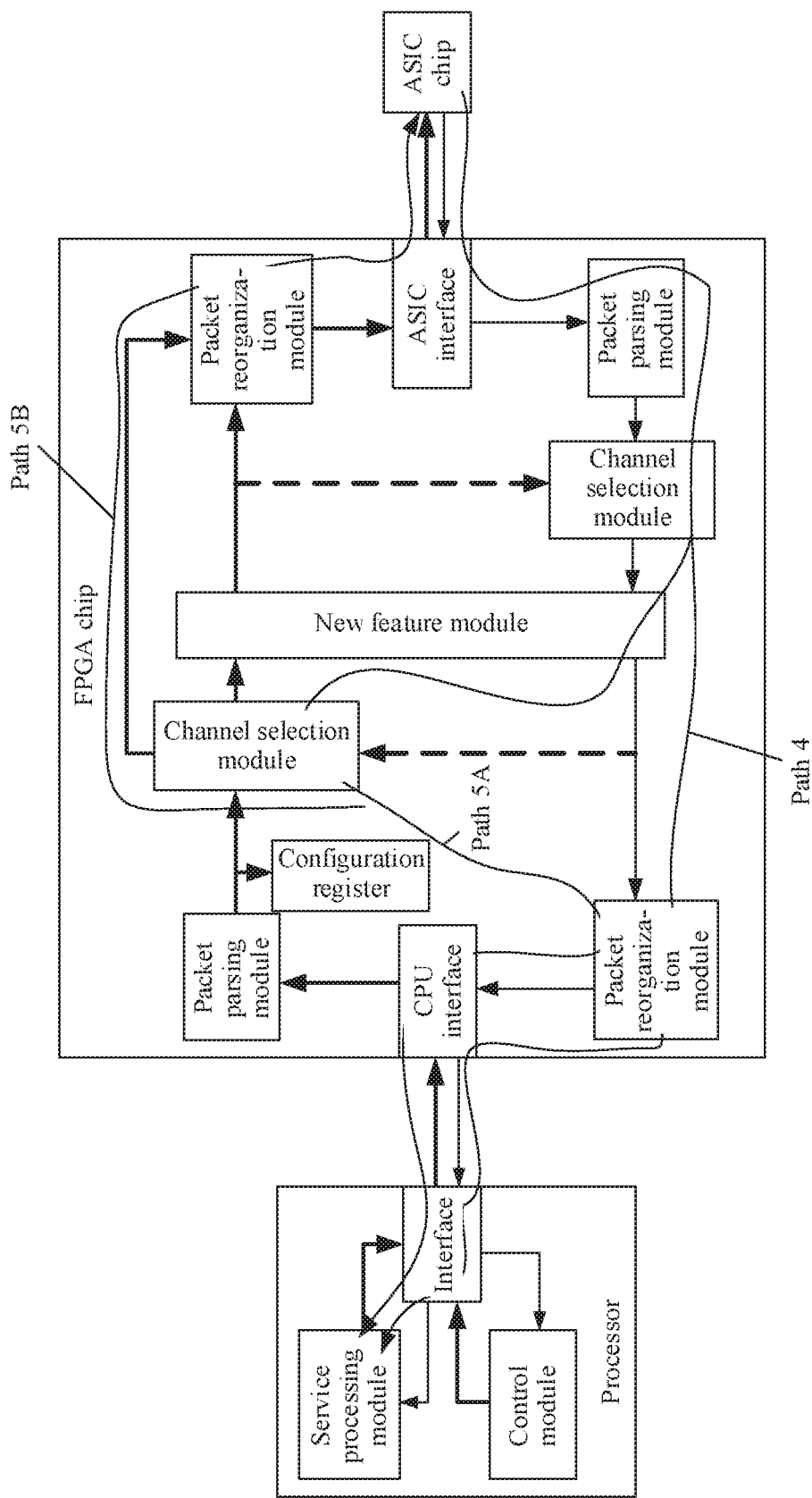
FIG. 13 is a schematic diagram of a packet path based on FIG. 12 according to an embodiment.

After the step S603 is performed, this packet transmission procedure ends. In an example, in a process of performing steps S601 to S603, for a packet path, refer to a path 4 in FIG. 13.

S604: The channel selection module of the FPGA chip sends the sixth packet to a new feature module; and the new feature module processes the sixth packet based on a functional feature of the FPGA chip to obtain an eighth packet, and sends the eighth packet to the channel selection module.

If the channel selection module of the FPGA chip determines that the packet processed based on the functional feature of the FPGA chip needs to be sent to a CPU, step S606 is performed; or if the channel selection module of the FPGA chip determines that the packet processed based on the functional feature of the FPGA chip needs to be returned to the ASIC chip, step S605 is performed.

S605: The channel selection module of the FPGA chip sends the eighth packet to a packet reorganization module; the packet reorganization module reorganizes the eighth packet to generate a ninth packet, and sends the ninth packet to the ASIC chip through the ASIC interface of the FPGA chip; and after receiving the ninth packet, the ASIC chip processes the ninth packet based on a functional feature of the ASIC chip.

After the step S605 is performed, the packet obtained after processed by the ASIC chip is used as the sixth packet, and is returned to perform step S601. In an example, in a process of performing steps S601, S602, S604, and S605, for a packet path, refer to a path 5A in FIG. 13.

S606: The channel selection module of the FPGA chip sends the eighth packet to a packet reorganization module; and the packet reorganization module reorganizes the eighth packet to generate a tenth packet, and sends the tenth packet to the CPU through a CPU interface of the FPGA chip.

After the step S606 is performed, this packet transmission procedure ends. In an example, in a process of performing the steps S601, S602, S604, and S606, for a packet path, refer to a path 5B in FIG. 13.

It should be noted that a function of the "new feature module" described above may be obtained by programming the FPGA chip based on an actual service application scenario.

In a block diagram of implementing the FPGA chip, the "new feature module" is configured to extend the functional feature of the ASIC chip. This embodiment mainly describes a specific implementation solution of the "new feature module". This embodiment is a further service conduct of the foregoing described embodiment, and is a comparatively specific application solution based on a server architecture (namely, the server shown in FIG. 2) provided in the embodiments.

In a scenario to which public cloud virtualization is applicable, a physical network card is usually an ASIC chip. The physical network card may support a physical function (PF) feature and a virtual function (VF) feature. Each VF may be used as a virtual network card. In other words, each VF may be used as a virtual device. A virtualized network card resource (namely, the virtual network card) may be allocated to a user for use, to improve actual utilization of the physical network card. In a scenario to which a public cloud is applicable, utilization of a single physical network card is usually not high, and a resource is not fully used. One VF can support one or more network card queues. A bandwidth capability of each VF is affected by a quantity of network card queues in the physical network card.

The following specifically describes the technical solutions provided in the embodiments by using Embodiment 1 and Embodiment 2.

Embodiment 1

Figure 14:
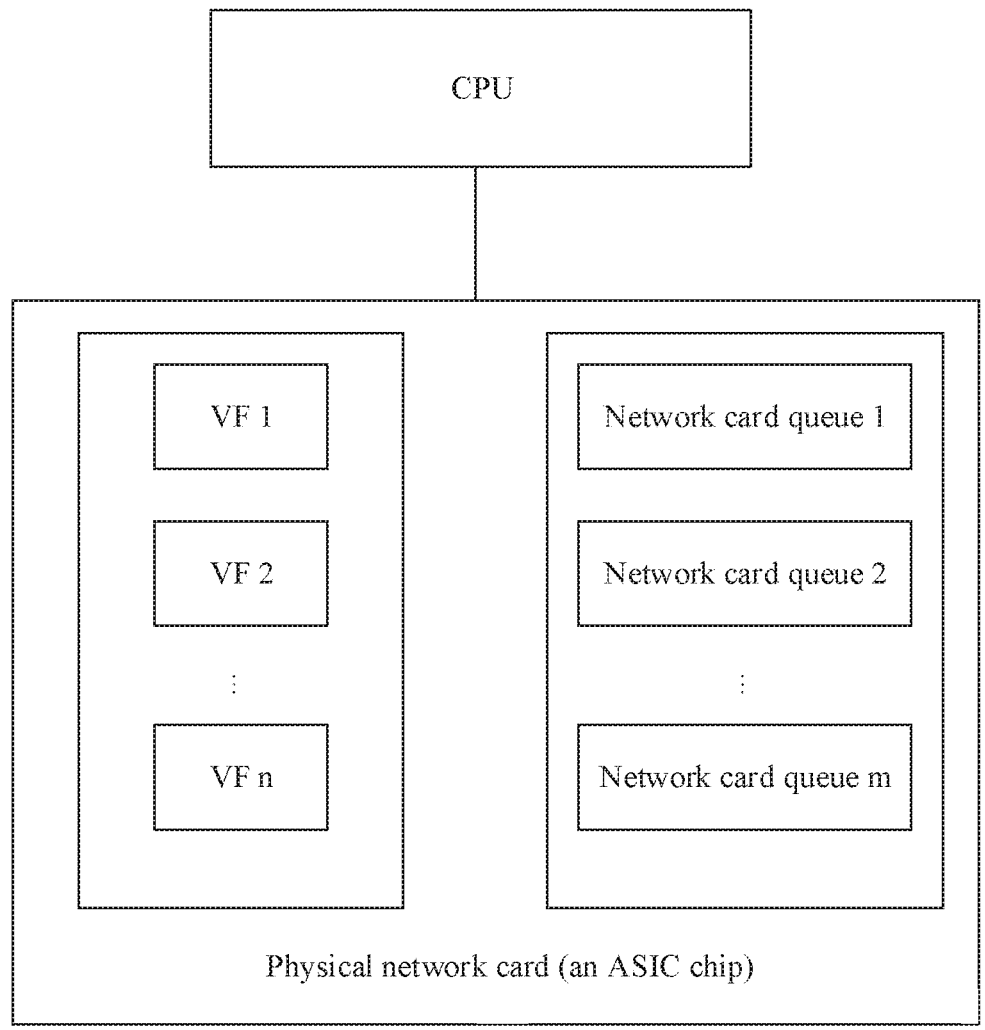
FIG. 14 is a schematic diagram of a correspondence between a CPU and a VF/network card queue in a conventional technical solution.

In a conventional technical solution, a physical network card is directly interconnected to a CPU. In this case, the CPU directly reads n VFs and m network card queues, as shown in FIG. 14, where both n and m are integers greater than or equal to 1. However, due to a design limitation of the physical network card, one physical network card can virtualize a limited quantity of devices (for example, due to a PCIe protocol limitation, a maximum of 256 VFs can be supported). A quantity of network card queues is determined after the design of the physical network card is completed, and no extra expansion is allowed. Therefore, in the conventional technical solution, a quantity of VFs that can be expanded by one physical network card is limited.

Figure 15:
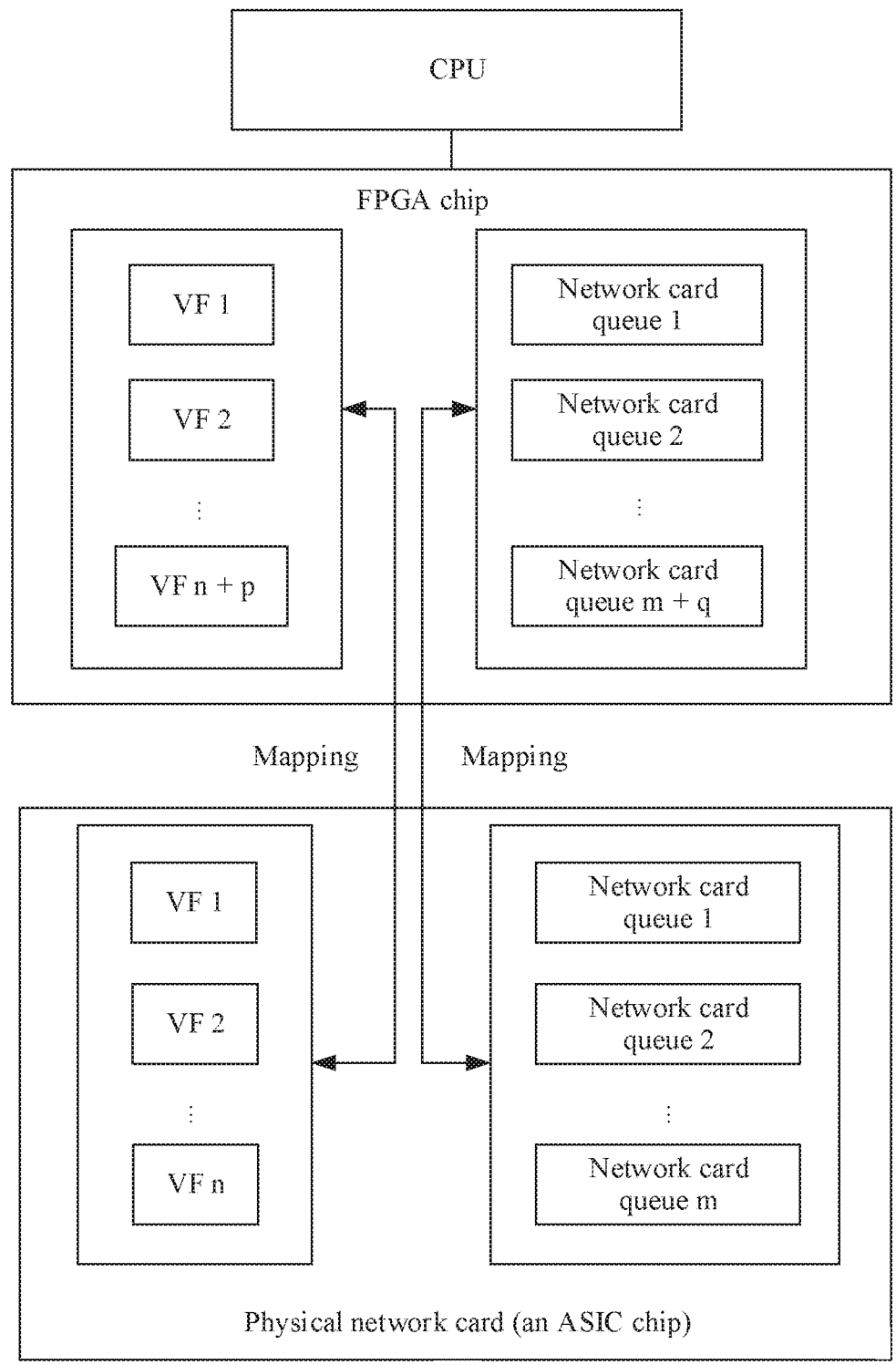
FIG. 15 is a schematic diagram of a correspondence between a CPU and a VF/network card queue according to an embodiment.

Based on this, when the technical solution provided in the embodiments is applied, an FPGA chip may be disposed between the physical network card and the CPU, and the FPGA chip is programmed to expand the quantity of VFs and the quantity of network card queues of the physical network card. Therefore, more users can use the physical network card. In this case, a functional feature that needs to be implemented by a new feature module of the FPGA chip is expanding the quantity of VFs and the quantity of network card queues of the physical network card. In this case, the CPU can read n+p VFs and m+q network card queues, as shown in FIG. 15, where both p and q are integers greater than or equal to 1.

In this embodiment, the functional feature supported by the new feature module may specifically include mapping an FPGA chip resource to a network card resource. The FPGA chip resource includes the n+p VFs and the m+q network card queues that are presented to the CPU, and the network card resource includes the n VFs and the m network card queues. Specifically, the new feature module may be configured to map each VF in the n+p VFs presented by the FPGA chip to the CPU to one VF in the ASIC chip, and map each network card queue in the m+q network card queues presented by the FPGA chip to the CPU to one network card queue in the ASIC chip.

One or more VFs (or the network card queues) presented by the FPGA chip to the CPU may correspond to a same VF (or the network card queue) in the ASIC chip. An example of a correspondence (namely, a mapping relationship) may be shown in Table 3.

TABLE 3

| VF presented by an FPGA chip to a CPU | VF in an ASIC chip |
|---|---|
| VF 1 to VF x | VF |
| VF x + 1 to VF y | VF 2 |
| ... | ... |
| VF z + 1 to VF t | VF n − 1 |
| VF t + 1 to VF n + p | VF n |

$1<x<y<z<t$, and $n+p \leq t+1$, and x, y, z, and t are integers. Based on Table 3, a correspondence between the m+q network card queues presented by the FPGA chip to the CPU and the network card queue in the ASIC chip may be obtained through inference. Details are not described herein.

In an example, the new feature module may include a scheduling module 1 and a scheduling module 2. The scheduling module 1 is configured to, based on a correspondence between "a VF presented to the CPU" and "a VF in the ASIC chip", send, to a corresponding VF in the ASIC chip, packet data that is from the CPU and that is received by one VF presented to the CPU, and send, to a corresponding VF presented to the CPU, packet data that is from the ASIC chip and that is received by one VF in the ASIC chip.

Figures 16A, 16B:
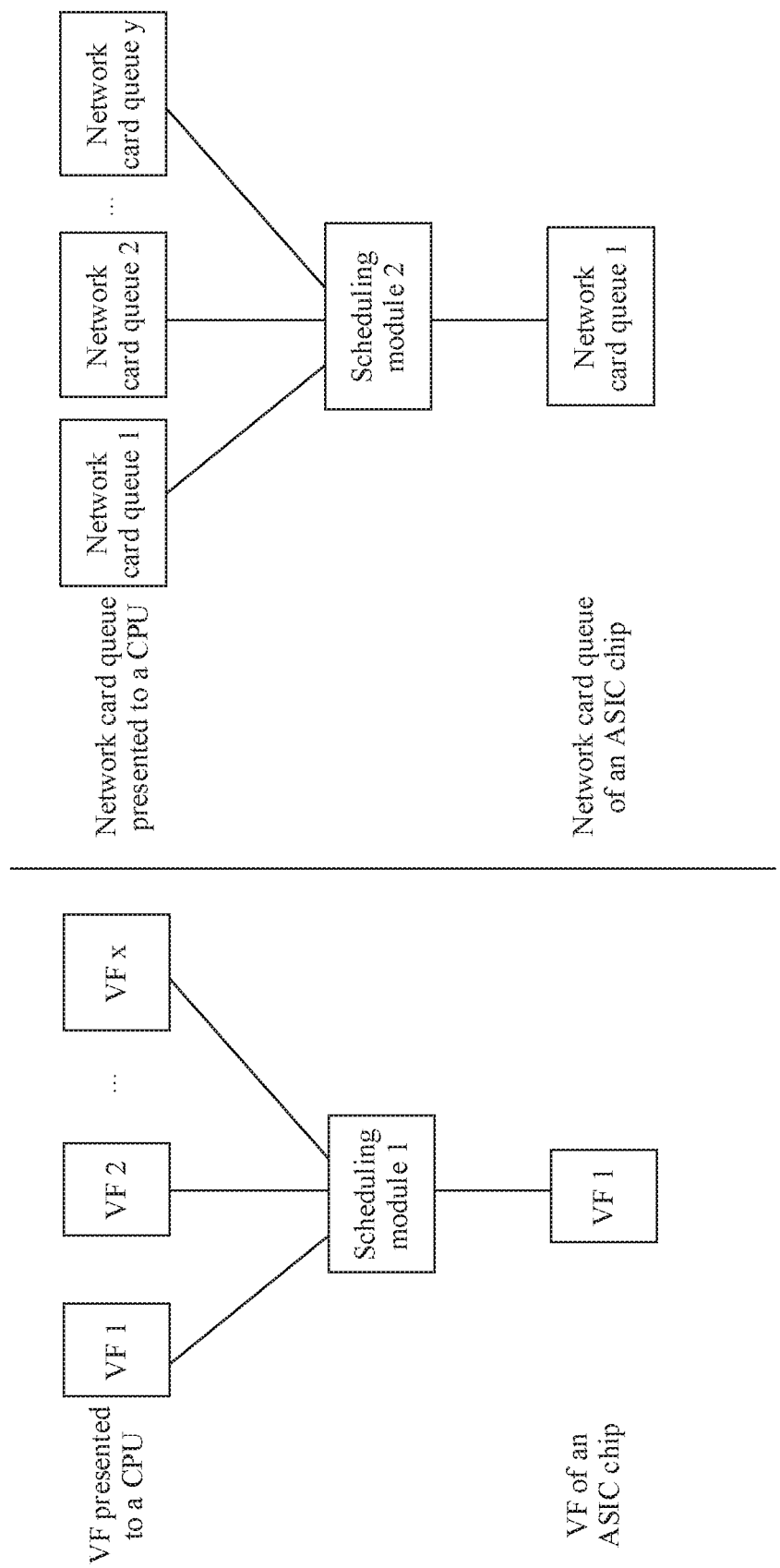
FIG. 16A and FIG. 16B is a schematic diagram of a correspondence between a scheduling module and a VF/scheduling module according to an embodiment.

For example, based on Table 3, the scheduling module 1 may send, to a VF 1 in the ASIC chip, the packet data sent by one of VF 1 to VF x, as shown in FIG. 16A. Alternatively, the scheduling module 1 sends to a VF in the VF 1 to VF x, the packet data sent by the VF1 in the ASIC chip.

The scheduling module 2 is configured to, based on a correspondence between "the network card queue presented to the CPU" and "the network card queue in the ASIC chip", send, to a corresponding network card queue in the ASIC chip, packet data that is from the CPU and that is received by one network card queue presented to the CPU, and send, to a corresponding network card queue presented to the CPU, packet data that is from a network and that is received by using one network card queue in the ASIC chip. For example, the scheduling module 2 may send, to a network card queue 1 in the ASIC chip, the packet data sent by one of network card queue 1 to network card queue y, as shown in FIG. 16B. Alternatively, the scheduling module 2 sends to a network card queue in the network card queue 1 to network card queue y, the packet data sent by the network card queue 1 in the ASIC chip, where $1 \leq y < m+q$, and y is an integer.

Embodiment 2

In a conventional technical solution, a quantity of network card queues supported by each VF cannot be changed after being set.

When the technical solution provided in the embodiments is applied, because an FPGA chip is programmable, a correspondence between a VF and a network card queue may also be adjusted based on a service requirement. For example, in a cloud computing equipment room, different services are deployed in two same hardware environments. One is a light-load scenario (for example, document editing), and the other is a heavy-load scenario (for example, a game application). Each VF needs only two network card queues in the light-load scenario. Each VF needs four network card queues in the heavy-load scenario. In this case, a solidified ASIC chip is usually not easy to be adjusted. However, the FPGA chip may be quickly adjusted by modifying logic code, to optimize resource allocation. This brings a typical advantage that the quantity of network card queues corresponding to each VF is variable, which overcomes a limitation on a maximum quantity of (or supportable) network card queues that can be controlled by each VF in a conventional technology, helps improve flexibility of a service implementation, and helps improve service data bandwidth performance.

Figure 17:
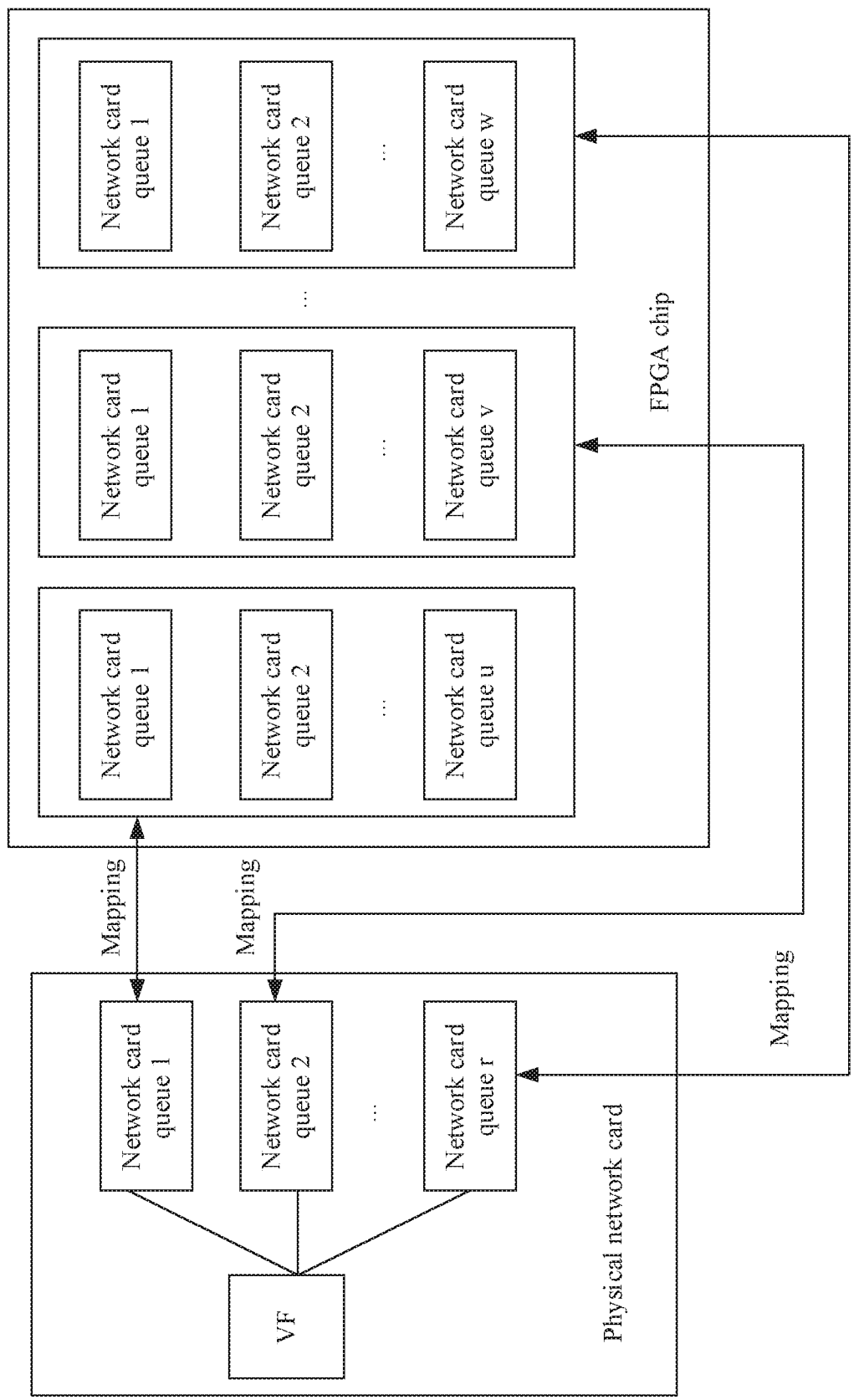
FIG. 17 is a schematic diagram of a correspondence between a VF and a network card queue according to an embodiment.

In this embodiment, a functional feature supported by a new feature module may specifically include mapping a queue of the FPGA chip to a network card. For example, refer to FIG. 17. One VF in a physical network card corresponds to r network card queues (signed as network card queues 1 to r). The FPGA chip can be programmed to map each network card queue in the network card queues to one or more network card queues in the FPGA chip. For example, a network card queue 1 in the physical network card is mapped to network card queues 1 to u in the FPGA chip, a network card queue 2 in the physical network card is mapped to network card queues 1 to v in the FPGA chip, . . . , and a network card queue r in the physical network card is mapped to network card queues 1 to w in the FPGA chip, where r, u, v, and w are all positive integers. Therefore, the FPGA chip can be programmed to adjust a mapping relationship between a network card queue in the physical network card and a network card queue in the FPGA chip, and adjust the network card queue supported by each VF.

The foregoing mainly describes the solutions provided in the embodiments from a perspective of the methods. To implement the foregoing functions, the solutions provided in the embodiments include corresponding hardware structures and/or software modules for performing the functions. A person of ordinary skill in the art should easily be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments, division into the functional module may be performed on the second processing chip based on the foregoing method embodiment. For example, each functional module may be divided based on each function, or two or more functions may be integrated in one processing module. The integrated module may be implemented in a form of hardware, or may be implemented in a form of a software functional module. It should be noted that, in the embodiments, division into the modules is an example, and is merely a logical function division. In an actual implementation, another division manner may be used.

Figure 18:
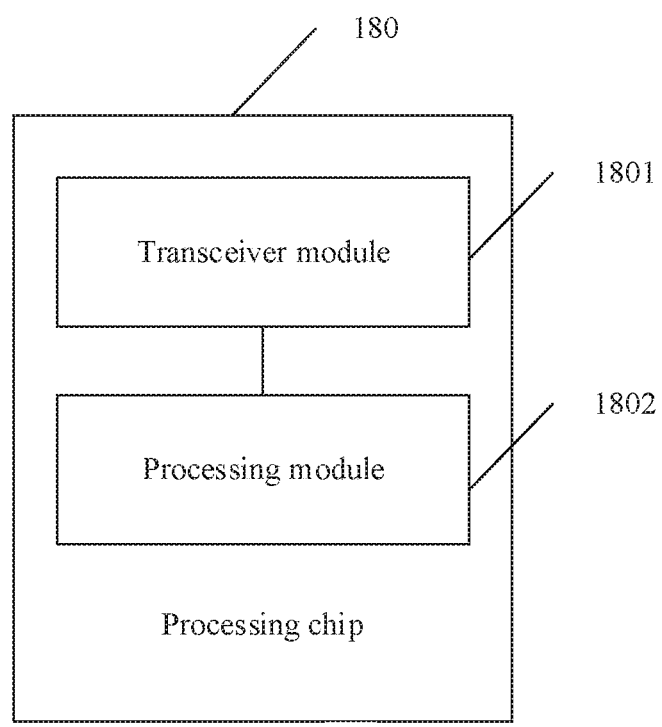
FIG. 18 is a schematic diagram of a structure of a processing chip according to an embodiment.

FIG. 18 is a schematic diagram of a structure of a processing chip 180 according to an embodiment. In an example, the processing chip 180 may be the second processing chip described above, for example, an FPGA chip, and is configured to perform the steps performed by the FPGA chip. The processing chip 180 is applicable to a server. The server further includes a processor and a first processing chip. The processing chip 180 is separately connected to the processor and the first processing chip. The first processing chip is a non-programmable chip. The processing chip 180 is a programmable chip, and the processing chip 180 supports a second functional feature. The processing chip 180 may include a transceiver module 1801 and a processing module 1802. The transceiver module 1801 is configured to receive a first packet sent by the processor or the first processing chip. The processing module 1802 is configured to process the first packet based on the second functional feature to obtain a second packet. The transceiver module 1801 is further configured to send the second packet to the first processing chip or the processor.

For example, with reference to FIG. 6, the transceiver module 1801 may be configured to perform a receiving step corresponding to the sending step in S201, the sending step in S205, and the returning step in S206. The processing module 1802 may be configured to perform the step S204.

For example, with reference to FIG. 9, the transceiver module 1801 may be configured to perform a receiving step corresponding to the sending step in S401, the sending step in S403, and the returning step in S404. The processing module 1802 may be configured to perform the step S402.

For example, with reference to FIG. 11, the transceiver module 1801 may be configured to perform a receiving step corresponding to the sending step in S501, the sending step in S503, the returning step in S505, and the sending step in S506. The processing module 1802 may be configured to perform the step S504.

Optionally, the transceiver module 1801 is further configured to if the second packet carries identification information of the first processing chip or information about a functional feature supported by the first processing chip, send the second packet to the first processing chip; or if the second packet carries information about the processor, send the second packet to the processor.

Optionally, when the first packet is a packet sent by the processor, the processing module 1802 is further configured to parse the first packet to obtain indication information. The indication information indicates whether the first packet needs to be processed based on the second functional feature. In this case, when processing the first packet based on the second functional feature to obtain the second packet, the processing module 1802 is further configured to when the indication information indicates that the first packet needs to be processed based on the second functional feature, process the first packet based on the second functional feature to obtain the second packet. For example, with reference to FIG. 6, the processing module 1802 may be configured to perform the steps S202 and S204.

Optionally, the transceiver module 1801 is further configured to when the indication information indicates that the first packet does not need to be processed based on the second functional feature, send the first packet to the first processing chip.

Optionally, the first packet carries a logical address of the processing chip 180, and there is a correspondence between the logical address of the processing chip 180 and a physical address of the first processing chip. The processing module 1802 is further configured to when the indication information indicates that the first packet does not need to be processed based on the second functional feature, replace the logical address that is of the processing chip 180 and that is carried in the first packet with the physical address that is of the first processing chip and that is corresponding to the logical address of the processing chip 180, to obtain a third packet. The transceiver module 1801 is further configured to send the third packet to the first processing chip.

Optionally, the first processing chip is an ASIC chip, and the processing chip 180 is an FPGA chip.

In an example, with reference to FIG. 4A, the transceiver module 1801 may be implemented by using the first interface 1032 and/or the second interface 1033 in FIG. 4A, and the processing module 1802 may be implemented by using the processing module 1035 in FIG. 4A.

For explanations, descriptions of beneficial effects, and the like of related content of any processing chip 180 provided above, refer to the foregoing method embodiments. Details are not described herein again.

All or some of the foregoing embodiments may be implemented by using software, hardware, firmware, or any combination thereof. When a software program is used to implement the embodiments, all or some of the foregoing embodiments may be implemented in a form of a computer program product. The computer program product includes one or more computer instructions. When the computer executive instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations. Any variation or replacement readily figured out by a person skilled in the art based on the specific implementations provided shall fall within the protection scope of this disclosure.

What is claimed is:

1. A server, comprising:
   a processor configured to:
      generate a first packet, wherein the first packet comprises indication information indicating whether the first packet needs to be processed based on a first functional feature; and
      send the first packet;
   a first processing chip coupled to the processor, wherein the first processing chip is a non-programmable chip; and
   a second processing chip coupled to the processor and the first processing chip, wherein the second processing chip is a programmable chip, and wherein the second processing chip is configured to:
      exchange packets with the processor and the first processing chip;
      support the first functional feature;
      receive the first packet from the processor;
      process the first packet based on the first functional feature to obtain a second packet and send the second packet to the processor when the indication information indicates that the first packet needs to be processed based on the first functional feature; and
      send the first packet to the first processing chip when the indication information indicates that the first packet does not need to be processed based on the first functional feature.

2. The server of claim 1, wherein the second processing chip is further configured to further send the second packet to the first processing chip when the second packet comprises identification information of the first processing chip.

3. The server of claim 1, wherein the second processing chip is further configured to further send the second packet to the first processing chip when the second packet comprises information about a second functional feature supported by the first processing chip.

4. The server of claim 1, wherein the second processing chip is further configured to further send the second packet to the processor when the second packet comprises information about the processor.

5. The server of claim 1, wherein the first packet further comprises a logical address of the second processing chip, wherein there is a correspondence between the logical address and a physical address of the first processing chip, wherein the second processing chip is further configured to:
   further process the first packet by replacing the logical address with the physical address to obtain the second packet when the indication information indicates that the first packet does not need to be processed based on the first functional feature; and
   further send the second packet to the first processing chip, and
   wherein the first processing chip is configured to receive the second packet from the second processing chip.

6. The server of claim 5, wherein the processor is further configured to identify either the first processing chip or the second processing chip in the server to obtain the correspondence.

7. The server of claim 1, wherein the first processing chip is configured to:
   process a third packet to obtain the first packet; and
   send the first packet to the second processing chip, and
   wherein the second processing chip is further configured to:
      receive the first packet from the first processing chip; and
      further send the second packet to the processor.

8. The server of claim 1, wherein the first processing chip is configured to:
process a third packet to obtain the first packet; and
send the first packet to the second processing chip, and
wherein the second processing chip is further configured to:
receive the first packet from the first processing chip; and
further send the second packet to the first processing chip.

9. The server of claim 1, wherein the first processing chip is a customized application-specific integrated circuit (ASIC) chip, and wherein the second processing chip is a field-programmable gate array (FPGA) chip.

10. A packet transmission method implemented by a second processing chip in a server, comprising:
exchanging packets with a processor of the server and a first processing chip of the server;
supporting a first functional feature;
receiving a first packet from the processor, wherein the first packet comprises indication information indicating whether the first packet needs to be processed based on the first functional feature;
parsing the first packet to obtain the indication information;
processing the first packet based on the first functional feature to obtain a second packet when the indication information indicates that the first packet needs to be processed based on the first functional feature; and
sending, after the processing, the second packet to the processor or the first processing chip,
wherein the first processing chip is a non-programmable chip, and
wherein the second processing chip is a programmable chip.

11. The packet transmission method of claim 10, further comprising further sending the second packet to the first processing chip when the second packet comprises identification information of the first processing chip or information about a second functional feature supported by the first processing chip.

12. The packet transmission method of claim 10, further comprising sending the second packet to the processor when the second packet comprises information about the processor.

13. The packet transmission method of claim 10, further comprising further sending the first packet to the first processing chip when the indication information indicates that the first packet does not need to be processed based on the first functional feature.

14. The packet transmission method of claim 13, wherein the first packet further comprises a logical address of the second processing chip, wherein there is a correspondence between the logical address and a physical address of the first processing chip, and wherein the packet transmission method further comprises:
further processing the first packet by replacing the logical address with the physical address to obtain the second packet when the indication information indicates that the first packet does not need to be processed based on the first functional feature; and
further sending the second packet to the first processing chip.

15. The packet transmission method of claim 10, wherein the first processing chip is a customized application-specific integrated circuit (ASIC) chip, and wherein the second processing chip is a field-programmable gate array (FPGA) chip.

16. A second processing chip in a server, comprising
a memory configured to store instructions; and
a second processor coupled to the memory and configured to execute the instructions to:
exchange packets with a first processor of the server and a first processing chip of the server;
support a first functional feature;
receive a first packet, wherein the first packet comprises indication information indicating whether the first packet needs to be processed based on the first functional feature;
parse the first packet to obtain the indication information;
process the first packet based on the first functional feature to obtain a second packet when the indication information indicates that the first packet needs to be processed based on the first functional feature; and
send, after the processing, the second packet to the first processor or the first processing chip,
wherein the first processing chip is a non-programmable chip, and
wherein the second processing chip is a programmable chip.

17. The second processing chip of claim 16, wherein the first processing chip is a customized application-specific integrated circuit (ASIC) chip, and wherein the second processing chip is a field-programmable gate array (FPGA) chip.

18. The second processing chip of claim 16, wherein the first processor comprises a central processing unit (CPU), a system on a chip (SOC), or a digital signal processor (DSP).

19. The second processing chip of claim 16, wherein the second processing chip comprises a programmable logic component (PLD).

20. The second processing chip of claim 16, wherein the first processor, the second processor, and the first processing chip are communicatively coupled to each other using a Peripheral Component Interconnect Express (PCIE) bus, an Ultra Path Interconnect (UPI) bus, or a Cache Coherent Interconnect for Accelerators (CCIX) bus.

* * * * *